(12) United States Patent
Frailey

(10) Patent No.: US 12,099,213 B2
(45) Date of Patent: Sep. 24, 2024

(54) DEVICE TO REDUCE AMBIENT LIGHT REFLECTION

(71) Applicant: SunSee, LLC, South Bend, IN (US)

(72) Inventor: Daniel Frailey, South Bend, IN (US)

(73) Assignee: SUNSEE, LLC, South Bend, IN (US)

( * ) Notice: Subject to any disclaimer, the term of this patent is extended or adjusted under 35 U.S.C. 154(b) by 725 days.

(21) Appl. No.: 17/190,165

(22) Filed: Mar. 2, 2021

(65) Prior Publication Data

US 2021/0349243 A1    Nov. 11, 2021

Related U.S. Application Data

(60) Provisional application No. 63/020,366, filed on May 5, 2020.

(51) Int. Cl.
G02B 5/00        (2006.01)

(52) U.S. Cl.
CPC ................... G02B 5/003 (2013.01)

(58) Field of Classification Search
CPC .......... G02B 5/003; G02B 2207/123
See application file for complete search history.

(56) References Cited

U.S. PATENT DOCUMENTS

| | | |
|---|---|---|
| 4,121,303 A | 10/1978 | Reece |
| 4,235,523 A | 11/1980 | Lapeyre |
| 5,069,529 A | 12/1991 | Takahashi |
| 5,095,385 A | 3/1992 | Stroll |
| 5,233,468 A | 8/1993 | Mcnulty |
| 5,508,757 A | 4/1996 | Chen |
| 5,526,180 A | 6/1996 | Rausnitz |
| 5,589,985 A | 12/1996 | Heller et al. |
| 5,905,546 A | 5/1999 | Giulie et al. |
| 5,966,241 A | 10/1999 | Gilger |
| 5,988,823 A | 11/1999 | Wong |
| 5,997,145 A | 12/1999 | Mora |
| 6,115,238 A | 9/2000 | Von |
| 6,356,439 B1 | 3/2002 | Schmidt |
| 6,394,615 B1 | 5/2002 | Hill et al. |
| 7,304,839 B1 | 12/2007 | Burns |
| 7,427,140 B1 | 9/2008 | Ma |
| 8,696,144 B2 | 4/2014 | Luo |
| 8,952,947 B2 | 2/2015 | Li et al. |
| 2002/0066846 A1 | 6/2002 | Giulie et al. |
| 2002/0167629 A1 | 11/2002 | Blanchard |
| 2006/0077544 A1 | 4/2006 | Stark |
| 2006/0249189 A1 | 11/2006 | Ishmael |
| 2007/0075975 A1 | 4/2007 | Aguilera |
| 2009/0061945 A1 | 3/2009 | Ma |

(Continued)

FOREIGN PATENT DOCUMENTS

| | | |
|---|---|---|
| CN | 200956267 Y | 10/2007 |
| CN | 107450667 A | 12/2017 |

(Continued)

*Primary Examiner* — Elmito Breval
(74) *Attorney, Agent, or Firm* — Neal, Gerber & Eisenberg LLP

(57) ABSTRACT

A device is disclosed for reducing specular reflection when an electronic device having a backlit screen is used in an environment with a large amount of ambient light. A specular reflection-reduction device includes a panel configured to extend from a bottom edge of a display screen of an electronic device and toward eyes of a user.

16 Claims, 33 Drawing Sheets

(56) References Cited

U.S. PATENT DOCUMENTS

| | | |
|---|---|---|
| 2009/0174847 A1 | 7/2009 | Kuno |
| 2009/0296220 A1 | 12/2009 | Aguilera |
| 2011/0141571 A1 | 6/2011 | Allen |
| 2013/0250423 A1 | 9/2013 | Trantham |
| 2013/0341233 A1 | 12/2013 | Dow |
| 2016/0231771 A1 | 8/2016 | Chiu et al. |

FOREIGN PATENT DOCUMENTS

| | | | | |
|---|---|---|---|---|
| CN | 109683669 A | 4/2019 | | |
| DE | 29503652 U1 | 7/1996 | | |
| DE | 29710815 U1 | 8/1997 | | |
| DE | 29715913 U1 | 11/1997 | | |
| DE | 19634765 A1 | 3/1998 | | |
| DE | 19905000 A1 | 11/1999 | | |
| DE | 10111861 A1 | 9/2001 | | |
| DE | 202005016406 U1 | 2/2006 | | |
| DE | 102006004177 A1 | 7/2007 | | |
| DE | 102007022731 B4 | 5/2011 | | |
| DE | 102017202566 A1 * | 8/2018 | ......... | G02B 27/0101 |
| DE | 202018004138 U1 | 11/2018 | | |
| EP | 2589270 A1 | 5/2013 | | |
| GB | 2359019 A | 8/2001 | | |
| GB | 2359231 A | 8/2001 | | |
| GB | 2429141 A * | 2/2007 | ........... | G06F 1/1603 |
| GB | 2455719 A | 6/2009 | | |
| KR | 19980030064 U | 8/1998 | | |
| NL | 1038801 C2 | 11/2012 | | |
| TW | 200930079 A | 7/2009 | | |
| WO | 9801800 A2 | 1/1998 | | |
| WO | 2009003419 A1 | 1/2009 | | |
| WO | 2009082948 A1 | 7/2009 | | |
| WO | 2009082949 A1 | 7/2009 | | |
| WO | 2012003011 A1 | 1/2012 | | |
| WO | 2012045563 A2 | 4/2012 | | |
| WO | 2014056331 A1 | 4/2014 | | |

* cited by examiner

DEVICE TO REDUCE AMBIENT LIGHT REFLECTION

CROSS-REFERENCE TO RELATED APPLICATION

This application claims the benefit of U.S. Provisional Application No. 63/020,366, filed on May 5, 2020, which is incorporated by reference in its entirety.

FIELD OF THE INVENTION

The present disclosure relates generally to devices for reducing screen glare caused by external light sources, and improving users' visibility of backlit screens in environments with relatively bright external light sources, such as the sun. In particular, devices for reducing or preventing specular reflection are disclosed.

BACKGROUND

Digital display screens like the LCD screens used by laptop and tablet computers are often not easily or effectively used outdoors, because the relative brightness of the sun renders the screens hard to read. Using mobile phones with LCD screens outdoors is common but often a challenge for the same reason. Direct and ambient light reflects off the surface of the screen with luminous intensity greater than the images and text displayed by the backlight of the screen itself.

Some e-readers are easily visible in bright sunlight because they use a different digital display technology, sometimes known as e-Ink. E-Ink, rather than competing with ambient light like an LCD screen, actually uses the ambient light to radiate the image portrayed on the display. So whereas the large amount of ambient sunlight associated with outdoor environments competes with the backlight of an LCD or similar technology, the sunlight actually brightens the screen of an e-Ink display. Despite this advantage of e-Ink, there are disadvantages that limit the uses of e-Ink, such as slow image refresh, monochromatic palette, and image ghosting, to name a few.

Another solution to using digital screens in bright sunlit conditions can be found in the out-of-home signage/billboard industry. Some digital LED billboards are increasingly common in urban environments and along highways—both locations frequented with intense sunlight. These billboards overcome the competing ambient sunlight with sheer intensity—as much as 25× the lumens per square inch of some laptop displays, for example. However, this solution is highly energy-inefficient and thus poorly fit to portable electronics. A comparable-intensity screen might reduce the battery life of a smart phone by more than 91%, for example.

Without a screen technology appropriate to portable outdoor use, an alternative technique for dealing with the issue of bright ambient light includes reducing the amount of ambient sunlight competing with the screen. Some devices include full-hood designs, with panels extending from all edges of a display to form a complete tube, often terminating in a smaller aperture that conforms to the user's face. These devices are highly effective for enhancing visibility, however these hood devices often prevent users from enjoying themselves in the outside environment. These devices are rather awkward and prevent the user from seeing almost anything but the device display.

Another design type may include a three-quarter hood—a device with connected panels extending toward the user from the top and side edges of the display. These devices are also awkward, and have a cumbersome design that compromises the portability of the devices. These devices are also ineffective at preventing screen glare and reflection of ambient light off the screen into the user's eyes. With a wide viewing aperture and no bottom panel, three-quarter hoods fail to block the ambient light that most impedes the viewability of the device display—the light reflecting off the user.

Another design includes the single-panel visor, extending from the top edge of the display. This format is often integrated into a device case, may extend above the device by way of pivoting arms, and may offer protective qualities in addition to light-blocking. However, much like the three-quarter hood, these devices are rather ineffective as they fail to effectively block the light (e.g., light reflected off the user).

Another design includes anti-glare films. Rather than reducing the amount of light reflected off the screen to a substantial degree, these films refract it. The effect is beneficial in that it blurs away distracting reflections from the site of the viewer. However, these films do little to reduce the overall amount of ambient light reflecting off the device screen. The net effect is an unobstructed but low fidelity image, that remains difficult to comfortably view and/or read.

With the limitations from these solutions in mind, there is a need for a device that can effectively reduce the ambient light reflected into a user's eyes without compromising portability, ease of use, power consumption, and image fidelity and that demonstrates various other improvements to the solutions noted above. A long felt need exists for a solution to these issues to access modern technology outdoors in an effective manner.

SUMMARY

The foregoing and other objectives are achieved in accordance with the teachings and principles of the present disclosure through the provision of a new device for reducing or eliminating specular reflection from certain angles off the screen of an electronic device.

In one example, a device for reducing specular reflection includes a planar support structure, an opaque bottom layer affixed to a first side of the planar support structure, a non-reflective top layer affixed to a second side of the planar support structure, and an attachment mechanism configured to affix the device to an electronic device having a screen, such that the device extends at an angle from a bottom edge of the screen of the electronic device.

In a second example, a method of manufacturing a device for reducing specular reflection includes constructing a rigid planar support structure; adding one or more features to the rigid planar support structure to enable the rigid planar support structure to be compactible; reducing a weight of the rigid planar support structure; affixing an opaque bottom layer to a first side of the rigid planar support structure; affixing a non-reflective top layer to a second side of the rigid planar support structure; connectably attaching a secondary back panel to the rigid planar support structure; and affixing an attachment mechanism to the rigid planar support structure.

In a third example, a method of using a device for reducing specular reflection includes positioning a device to extend from a bottom edge of a screen of an electronic device, the electronic device resting on a support surface, the device comprising: a planar support structure; an opaque bottom layer affixed to a first side of the planar support structure; a non-reflective top layer affixed to a second side of the planar support structure; and an attachment mechanism. The method also includes expanding the device such that the dimensions of the device correspond to dimensions of the screen; and adjusting the device such that it extends at an angle of between 30-75 degrees from the bottom edge of the screen.

DETAILED DESCRIPTION

Figure 1A:
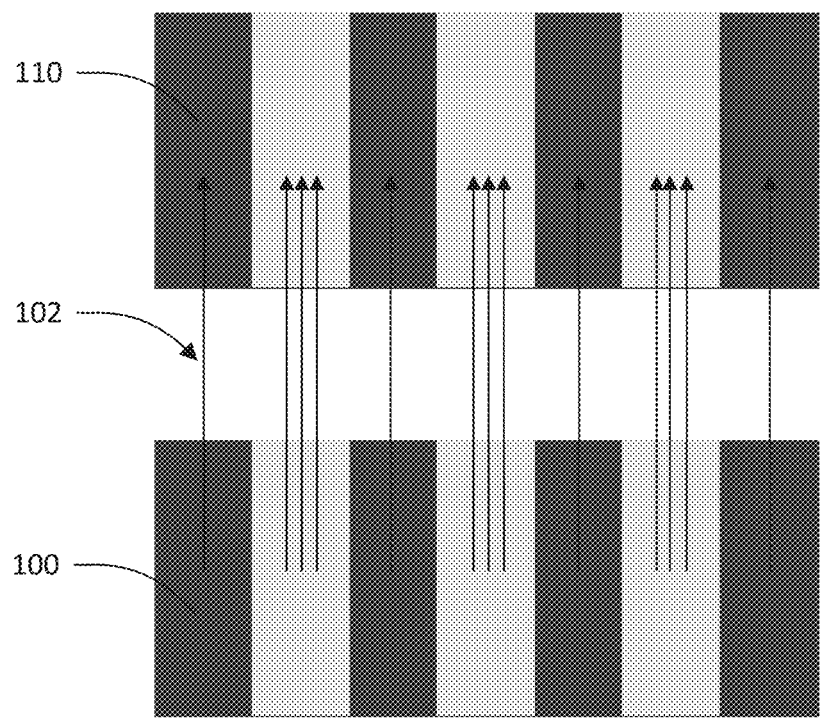
FIG. 1A illustrates an example screen and image as viewed by a user without ambient light reflected off the screen.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose unless otherwise stated herein. As stated above, the specification is intended to be taken as a whole and interpreted in accordance with the principles of the invention as taught herein and understood to one of ordinary skill in the art.

As noted above, it is often difficult use electronic devices with backlit displays in a brightly lit environments such as outside in the sun. FIG. 1A illustrates an ideal use of a screen 100. As an example, the screen 100 illustrates a pattern of alternating dark and bright lines. The backlight of the display 100 emits light 102, which is transmitted to the user. In an environment without external sources of light, the viewed image 110 as seen by the user matches the displayed image 100, and the user has no difficulty making out the displayed image.

Figure 1B:
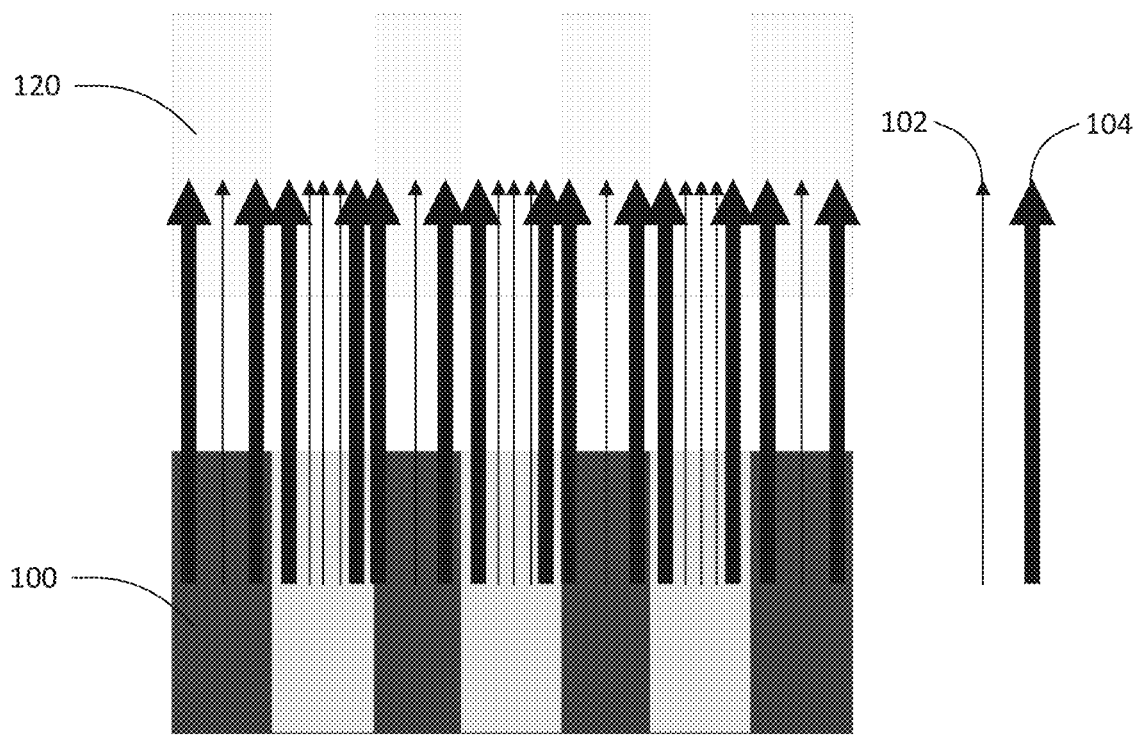
FIG. 1B illustrates the example screen and image as viewed by a user with ambient light reflected off the screen.

Alternatively, FIG. 1B illustrates a scenario in which the display 100 is used in a brightly lit environment. In FIG. 1B, the light emitted by the display is shown as arrows 102, while the light from the sun reflecting off the screen is shown as arrows 104. The same image is displayed by the display 100 as is displayed in FIG. 1A. However, when bright environmental light is reflected off the display screen, the bright reflection washes out the light from the display. This causes the viewed image 120 as seen by the user to have less contrast, and be difficult to see clearly.

Figure 2:
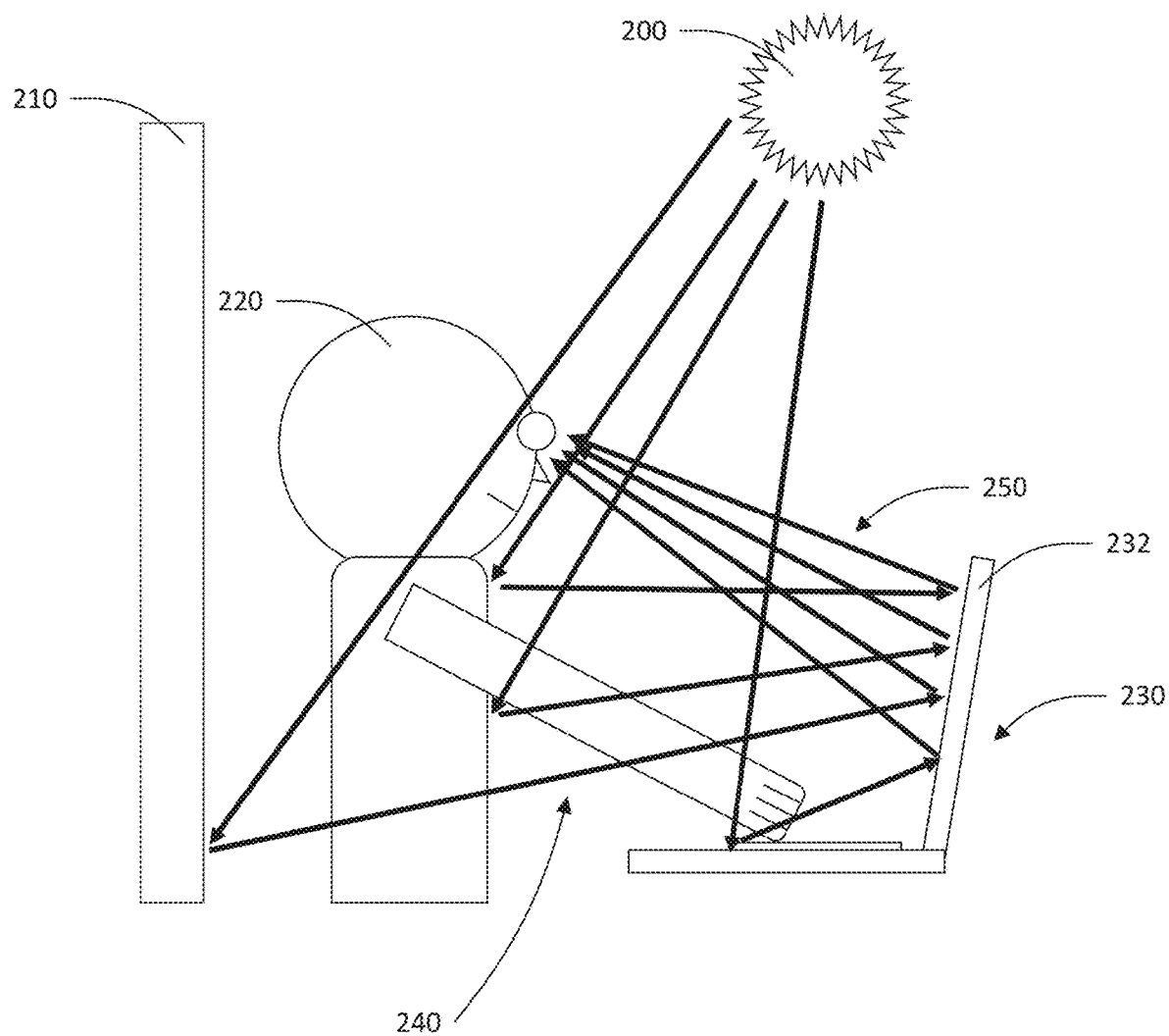
FIG. 2 illustrates a simplified side perspective view of a user operating a computing device in an outside environment.

FIG. 2 illustrates a simplified side perspective view of a user 220 operating an electronic device 230 in an outside environment, wherein the sun 200 is producing a large amount of ambient light. FIG. 2 also illustrates the path of the ambient light from the sun 200 when no light mitigation device is used. In this scenario, a portion of the light from the sun 200 reflects off the background 210 (or other objects in the environment of the user), off the user 220, and off the computing device 230 itself. This reflected light 240 is directed toward the screen 232 of the electronic device 230. The light is then reflected off the screen 232, and into the eyes of the user 220. This reflected light off the screen is shown as reference number 250. One skilled in the art would readily appreciate the same or similar dynamic could be caused by a light source other than the sun and the sun 200 is only depicted as exemplary.

Figure 3:
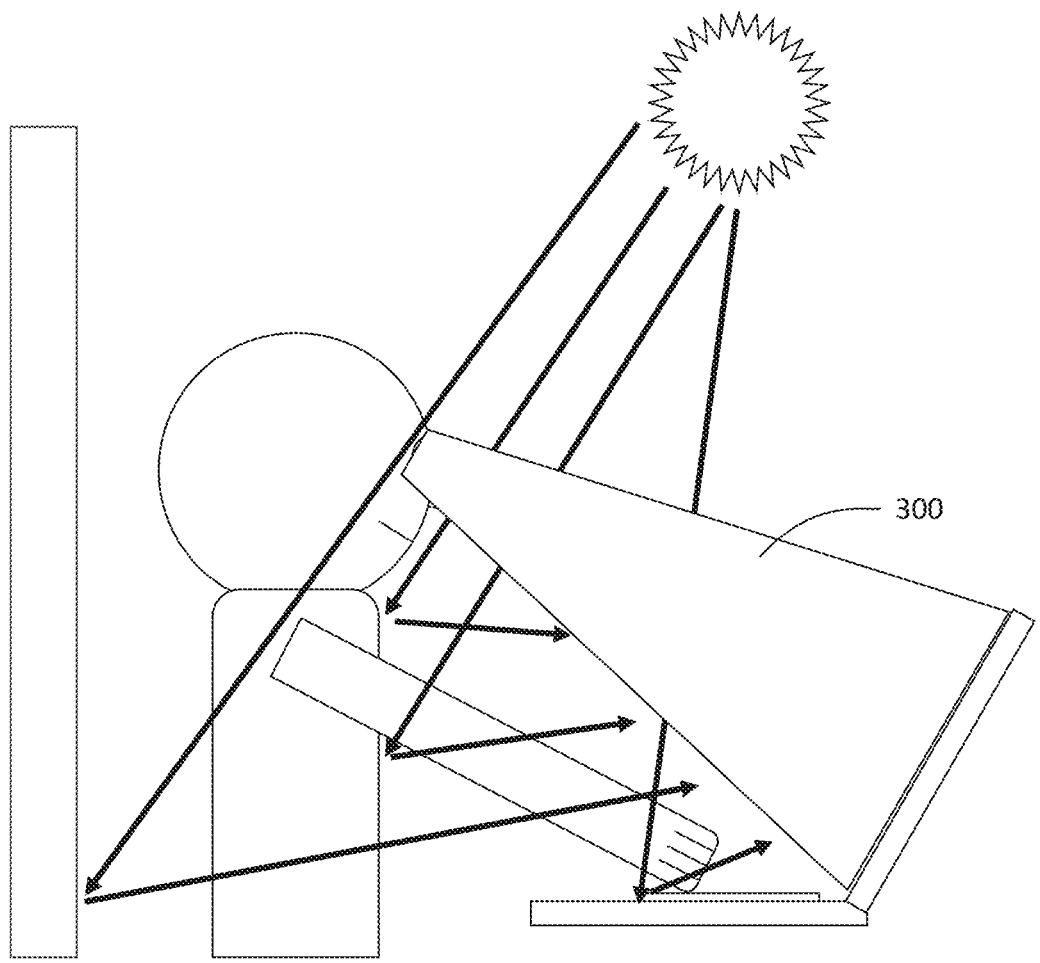
FIG. 3 illustrates the user and computing device along with a full hood.
Figure 4:
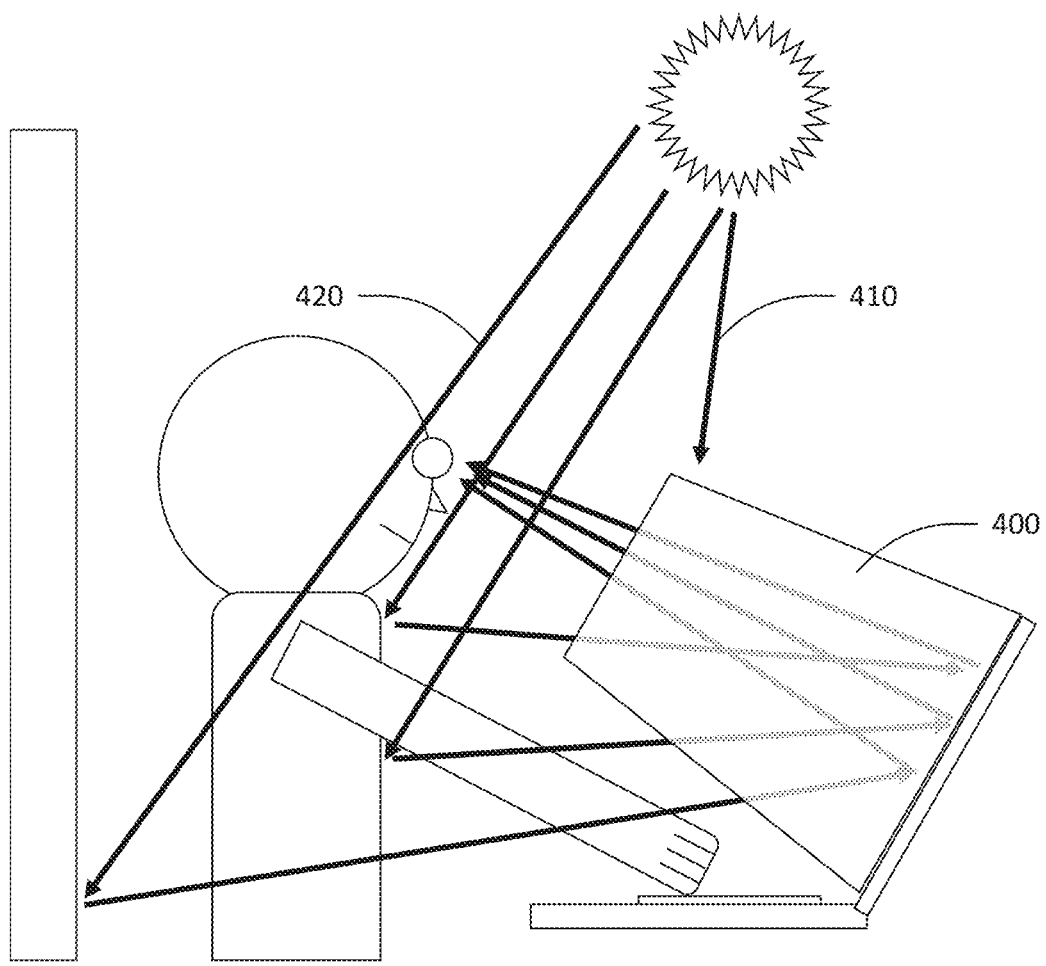
FIG. 4 illustrates the user and computing device along with a three-quarter hood.
Figure 5:
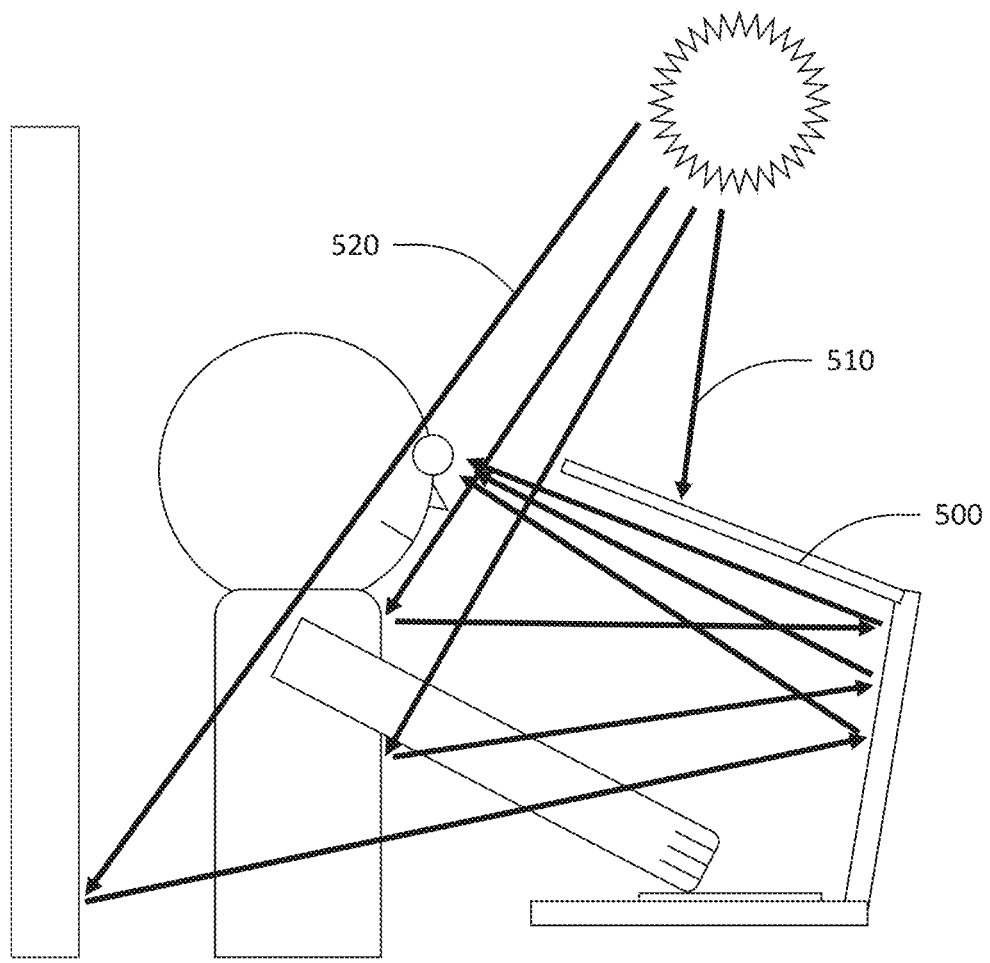
FIG. 5 illustrates the user and computing device along with a top panel device.

FIGS. 3, 4, and 5 illustrate various attempts in the prior art of mitigating the problems caused by this ambient light, by preventing some or all of the light from the sun from reaching the screen.

FIG. 3 illustrates a full hood 300 which extends from the display to the user's eyes. The full hood 300 includes opaque panels extending from the top, bottom, and both sides of the display, with a first aperture for the display, and a second, smaller aperture for the user's eyes. The full hood 300 attempts to block all ambient light, rendering the display much easier to read. However, the full hood is bulky, awkward to use, and does not provide a good user experience.

FIG. 4 illustrates a three-quarter hood 400. The three-quarter hood 400 is similar to the full hood 300, however it does not include a bottom panel extending from the bottom of the display. The three-quarter hood 400 includes opaque panels extending from the top and both sides of the display. The three-quarter hood 400 blocks some of the ambient light 410 from the sun. However, the three-quarter hood 400 fails to block the ambient light 420 that is reflected off the user or the background. Thus, the three-quarter hood 400 is not an effective solution.

FIG. 5 illustrates a top panel 500, without any side or bottom panels. The top panel 500 extends from the top of the display. The top panel 500 includes an opaque panel that blocks a portion of the light 510 from the sun. However, the top panel fails to block ambient light 520 that is reflected off the user or the background. Thus the top panel 500 is not an effective solution.

Example Embodiments

Embodiments of the present disclosure may reflect the consideration that the primary concern for making a screen discernible in brightly lit conditions is blocking the low-angle ambient light. Blocking low angle ambient light from reflecting off the screen may be even more important than blocking direct light or high angle ambient light. Considering the positioning of a user with respect to their display screen (e.g., a laptop or tablet computer, mobile phone, etc.), the eyeball of the user is typically looking downward from above the display screen, and the display screen is typically angled somewhere between orthogonal to the line of sight and exactly vertical. As a result, ambient light that reflects off the screen and up into the eye of the user originates from a lower angle than that of the eyeball itself. In practice, this is illustrated by a user seeing his or her shirt reflected on the display screen in brightly lit conditions.

Given this observation, blocking low angle ambient light is important for making the screen discernible in bright ambient light conditions. As can be seen in FIGS. 4, and 5, the three-quarter hood and top panel fail to block the low angle ambient light. Embodiments of the present disclosure block the low angle ambient light by including an opaque light blocking panel between the screen and the user. The panel extends from the base of the display, and is angled upward toward the eye of the user. The panel is angled such that it is partially aligned or close to alignment with the user's eye angle to the screen, meaning that the user will see the panel at a nearly head-on angle, rendering the panel nearly invisible to the user. This also enables the user to freely use the keyboard, touchpad, or other user interface device. The panel also may include a non-reflective top surface, which is configured to prevent light from reflecting off the top of the panel, onto the screen, and into the eyes of the user.

In one embodiment, the reflection-reduction device of the present disclosure acts to prevent specular reflection of light off the screen, while permitting would-be diffuse light to reach and reflect off the screen. This may be different from an anti-glare visor or anti-glare device, which prevents diffuse reflection of light from the screen.

An important aspect of various embodiments is their ability to block light from reaching the device screen that would result in specular reflection into the eye of the user. All ambient and direct light that shines on the device screen will cause both specular and diffuse reflection. Diffuse reflection radiates in every direction from the point of incidence on the display screen. Specular reflection is that portion of the incident light that reflects in a predictable geometric fashion. Specular reflection is noteworthy, because it carries the majority of the luminous intensity originally delivered by the incident light. Diffuse light carries substantially less. As a result, specular reflection is the cause of more severe image obscurity on a back-lit display screen in bright conditions. It is also noteworthy that the geometric nature of its reflection means that the origin of light that might cause a specular reflection that impedes the vision of the user and, in cases where the user's eye is above the screen can be traced backward from the eye of the user, down to the device screen, down to some lower angle.

In light of the concerns noted above, example reflection-reduction devices of the present disclosure include a panel that extends from below the screen of the electronic device, has a non-reflective or minimally reflective top surface, and acts to reduce or prevent light from reflecting into the screen that comes from a low angle.

Figure 6:
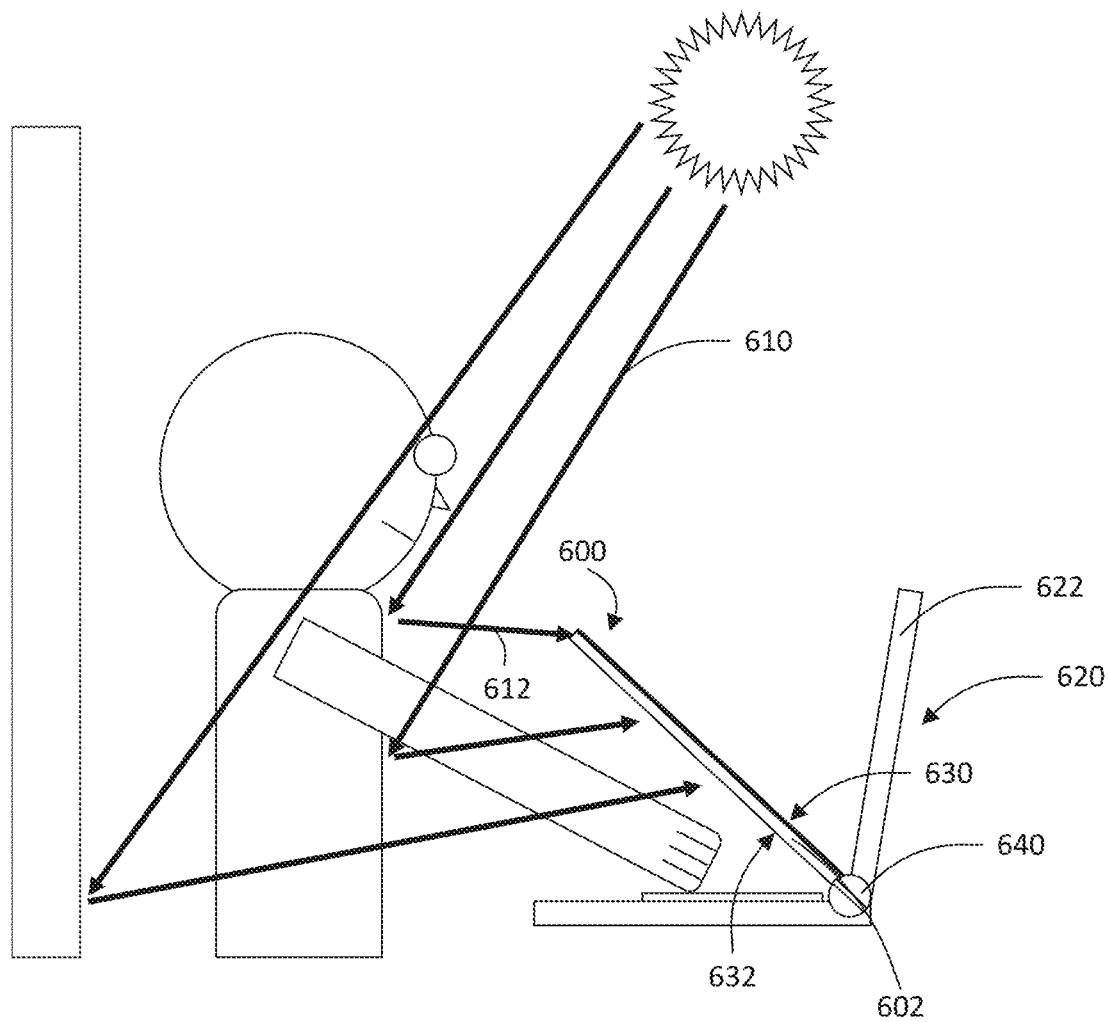
FIG. 6 illustrates the user and computing device along with an example reflection-reduction device, in accordance with some embodiments of the present disclosure.
Figure 7:
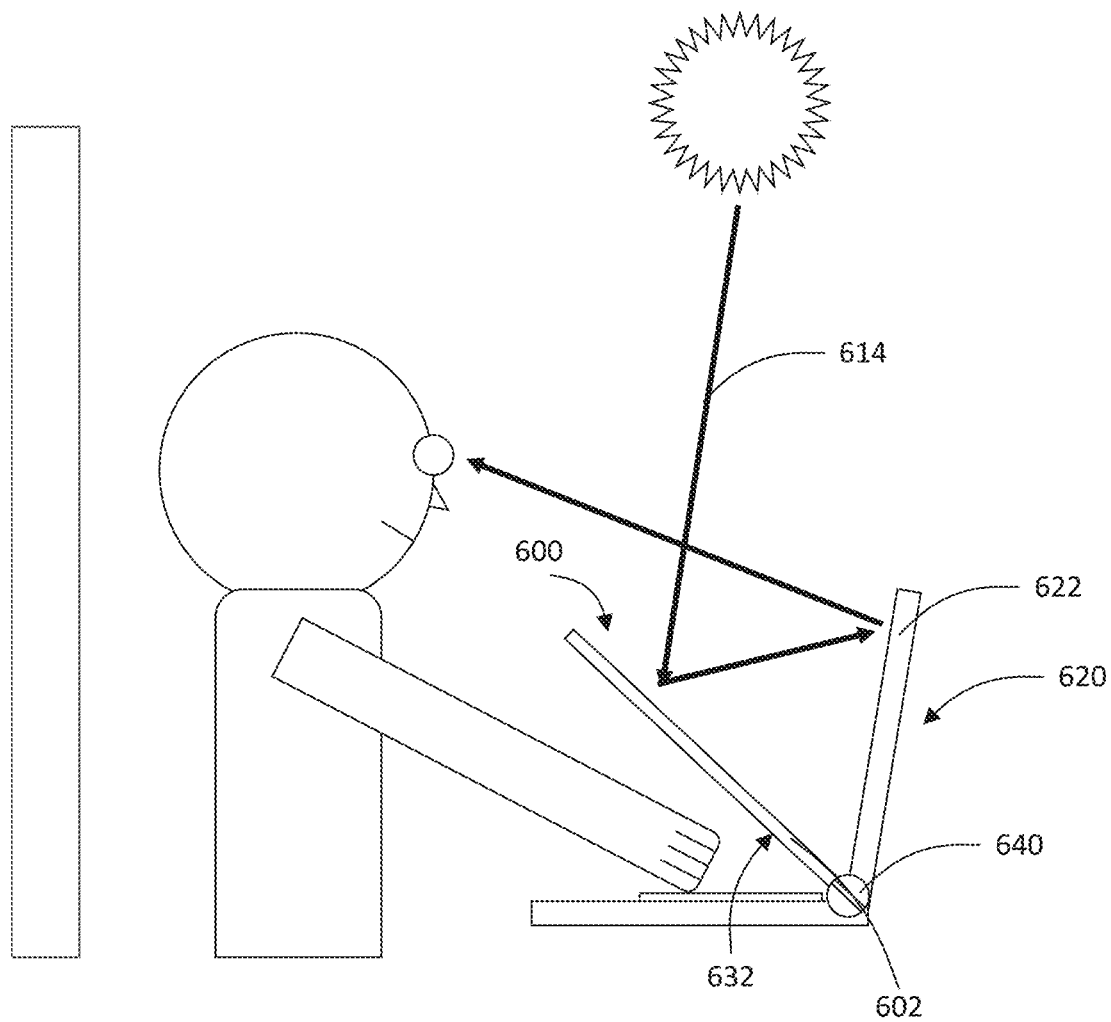
FIG. 7 illustrates the user and computing device along with a reflection-reduction device of FIG. 6 missing a non-reflective top layer, in order to illustrate the path of light reflecting off the top surface when the non-reflective top layer is not present.
Figure 8:
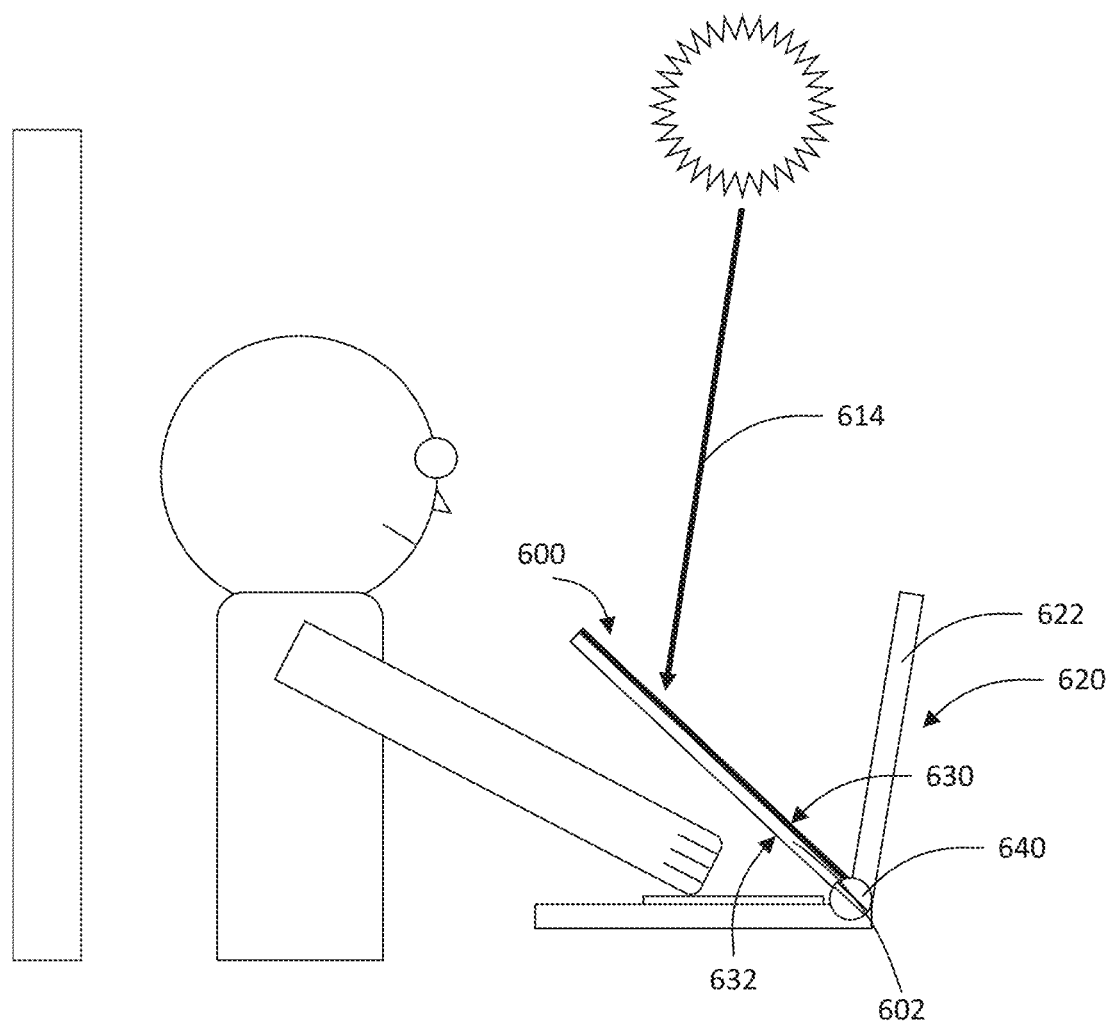
FIG. 8 illustrates the user and computing device along with the reflection-reduction device of FIG. 6, including an anti-reflection layer on the top surface of the reflection-reduction device, in accordance with some embodiments of the present disclosure.
Figure 9:
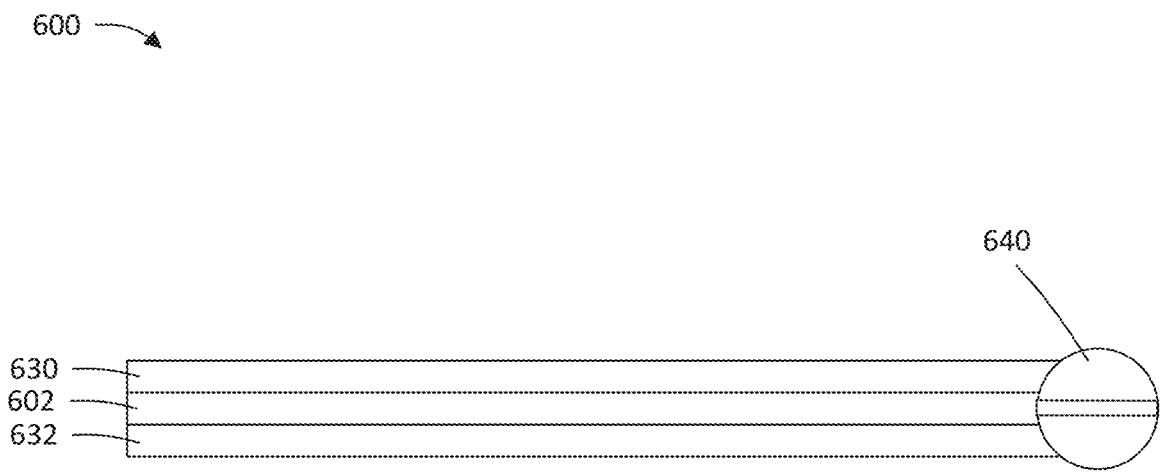
FIG. 9 illustrates an exaggerated side perspective view of the device of FIGS. 6, and 8, showing the support structure, bottom layer, top layer, and attachment mechanism.

FIGS. 6, 8, and 9 illustrate various examples of the reflection-reduction device 600 of the present disclosure. FIG. 7 illustrates an example device without a top non-reflective layer, illustrating the path of light reflected off the top of the device into the screen 622 and then into the eyes of the user.

In particular, FIG. 6 illustrates the path of ambient light 610 from the sun which reflects off the user and the background. Typically, reflected light 612 would then reflect off the screen 622 of the electronic device 620, and into the user's eyes. However, the bottom side of the reflection-reduction device 600 prevents the reflected light 612 from reaching the screen 622.

FIG. 7 illustrates that without a non-reflective top layer, some light 614 from the sun directly reflects off the top side of the reflection-reduction device 600, and then reflect off the screen 622 of the electronic device 620 into the user's eyes.

FIG. 8 illustrates that the reflection-reduction device 600 includes a non-reflective or minimally reflective top surface 630, which prevents the light 614 from reflecting off the reflection-reduction device 600 onto the screen 622 and into the user's eyes. The reflection-reduction device 600 may include an opaque bottom layer 632 that can comprise a reflective, non-reflective, or minimally reflective opaque surface.

FIG. 9 illustrates an expanded side perspective view of the reflection-reduction device 600 shown in FIGS. 6 and 8. FIG. 9 illustrates that the reflection-reduction device 600 includes (1) a panel comprising a support structure 602, an opaque bottom layer 632, and a non-reflective top layer 630, and (2) an attachment and positioning mechanism 640.

Panel

The panel 600 may extend from a bottom edge of the display screen 622 in the direction of the eye of a user. The panel is rigid or semi-rigid, in order to project straight out for a distance comparable to the dimensions of the display screen 622, and to support its own weight. The panel may also be opaque in order to block light radiating toward screen 622 from a low angle.

In some examples, the panel may be a quadrilateral shape (such as a rectangle, square, trapezoid, and more), while in other examples the panel may include more or fewer sides, and/or may be curved. In some examples, the panel may be concave or convex, such that the surface(s) of the panel are not flat.

The panel includes an opaque layer. The opaque layer may have dimensions comparable to or the same as the dimensions of the screen 622 of the electronic device 620. For example, if the screen 622 is 13" wide by 8" tall (e.g., a 15.6" diagonal laptop screen), the opaque layer of the panel may have the same dimensions. In some examples, the dimensions of the opaque layer of the panel may be the same or greater than the dimensions of the screen 622, may include the same aspect ratio as the dimensions of the screen 622, or may be comparable to the dimensions of the screen 622 in some other way.

In some examples, the panel width may be between 75% and 200% of the screen 622 width. When in use, the panel height, measured not vertically but along the direction of extension toward the eye of the user, should be preferably between 75% and 200% of the screen height. In the context of common laptop and tablet computer sizes, the panel may be from 5.5 inches to 22.5 inches in width and from 3.5 inches to 17.1 inches in height with respect to a landscape orientation to the device screen 622. In the context of common mobile device sizes, the panel may be from 1.5 to 6 inches in width and from 2.6 to 11 inches in height, with respect to a portrait orientation for the device screen 622.

In some examples, the panel may comprise multiple layers. This is shown in FIG. 9, wherein the rigid support structure 602 is affixed to the opaque bottom layer 632 on the bottom side, and the non-reflective top layer 630 on the top side. The rigid or semi-rigid structure may enable the panel to maintain an angle extending from the base or bottom of the screen 622 toward the eye of the user, without significant bending or deformation. In one example, the rigid or semi-rigid structure of the panel may be configured to enable the panel to extend from the base of the display and deform less than 20 degrees from the angle at which it extends from the base. In this manner, a minimal amount of bending or deformation is allowed, while still remaining effective at reducing ambient light. In some examples, the opaque layer and/or the rigid or semi-rigid structure is a commercial plastic or metal capable of withstanding expected heat exposure, weight constrictions and other requirements described herein. One skilled in the art would be able to select the appropriate plastic and/or metal substrate for these structures so they are not described in detail herein. A non-limiting list of exemplary materials for the opaque layer and/or the rigid or semi-rigid structure includes various natural materials like wood or paperboard; various metals and metal alloys; synthetic materials like plastics and ceramics; woven fabrics; and/or any combination of the preceding.

The rigid structure may extend the full length and width of the panel, and/or may only extend partially. For example, the rigid or semi-rigid structure may include holes or other parts of the surface cut out so as to reduce the weight, material use, and other aspects of the panel. In some examples, the rigid or semi-rigid structure may form the shape of the quadrilateral of the panel, a rectangular shape, an "X" shape, an "H" shape, a "U" shape, an "I I" shape, or any other suitable shape. In some examples, the rigid or semi-rigid structure may act as a frame for the opaque layer.

The opaque layer may be on a bottom side of the panel, separate from but affixed to the rigid or semi-rigid structure. Alternatively, the opaque layer may be the same layer as the rigid or semi-rigid layer, such that the rigid or semi-rigid structure acts as the opaque layer of the panel. Regardless of the construction, the bottom side of the panel is opaque and effectively blocks light from passing through the panel to the screen 622.

The panel includes a non-reflective or minimally reflective top surface or top layer (e.g., layer 630 in FIG. 8) facing the screen 622 of the electronic device 620. The top layer 630 may absorb more than 96% of visible light (i.e., wavelength 380 to 740 nm) in sunlit conditions (i.e., less than 100,000 lux). In some examples, the top layer 630 may be configured to absorb greater than 99% of visible light. These attributes can be inherent in the material of the top surface or may be achieved by spraying or affixing a non-reflective film or material to an otherwise reflective surface. Those skilled in the art can select a non-reflective surface in accordance with the present disclosure with no or minimal and routine experimentation. A non-limiting list of exemplary materials for the non-reflective or minimally reflective top surface includes (1) paint, such as Stuart Semple's Black 2.0 and Black 3.0, (2) various dyes appropriate to a chosen substrate, (3) applied material layers, such as black velvet, (4) coatings, such as Surrey NanoSystems Vantablack, and more.

In some examples, the reflection-reduction device 600 may include a further secondary opaque panel that shields the back of the device screen 622, to protect the back of the electronic device screen 622 from sunlight.

The non-reflective top layer 630 may be the same layer as the opaque panel, the rigid or semi-rigid structure, or may be a separate layer affixed to the opaque layer or the rigid or semi-rigid structure.

In some examples, the top layer 630 may be flat. In other examples, the top layer 630 may include a surface texture. In these examples, the surface texture, such as a corrugated surface or other non-smooth surface, may aid in decreasing reflected light from the top layer in furtherance of the goals of the present disclosure.

As noted above, the opaque bottom layer, the rigid or semi-rigid structure, and the non-reflective top layer may be separate or may be integrated with each other, such that one or more of the layers are formed together (e.g., the structure is an opaque material that acts as both the structure and opaque bottom layer). Where the layers are separate from each other, they may be affixed to each other either permanently or temporarily using any suitable mechanism, such as an adhesive, sewing, stapling, grommeting, snap buttons, Velcro, etc. or by shaping an outer layer as an enclosure to an inner layer, as an envelope to a letter, or as an outer band around an inner layer.

In some examples, the various layers of the panel may be any suitable thickness. In one example, the thickness of the panel is less than 20 mm, alternatively, less than 15 mm, alternatively, less than 10 mm, or alternatively less than 5 mm.

Attachment and Positioning

The panel may be attached to the electronic device 620 using any suitable mechanism for holding the panel in place, such as an adhesive, a stand, an attachment to the screen 622 or base of the electronic device 620, a hanger, clip, magnet, suction means, integration into the electronic device 620, integration into a third article such as carrying case, and more.

In some examples, the reflection-reduction device 600 may include a supporting mechanism for holding the panel in a position such that the panel extends from a bottom of the screen 622. The supporting mechanism may include supporting legs extending from the panel so that the panel stands in a useful position and angle upon the same surface as the device screen 622 (e.g., table, counter, user's lap, etc.). In some examples, the supporting mechanism may rest on or be attached to the electronic device 620 itself, such as the bottom or base portion of a typical laptop computer.

In some examples, one or more legs of the support mechanism may connect with each other below the panel to improve their function in stably holding up the panel on various surfaces (e.g., in a scissor pattern). Legs of the support mechanism may be constructed of a design that is bendable along its length, either due to having multiple joints that can both bend and hold their position, due to a material construction with innately similar properties, such as rubber-coated metal wire, or due to some other property of the materials or construction. In some examples, the legs of the support structure may compact, telescope, or fold away for improved portability when not in use and to make an angle of use variable. In some examples, the support structure may include a single, wide support panel that folds down and away from the opaque panel.

In some examples, where the bottom opaque panel is separate from the rigid or semi-rigid structure and/or the top non-reflective layer, the bottom opaque panel may be configured to extend downward to the surface on which the electronic device 620 rests, to support the top panel.

In some examples, the panel may attach to any suitable part of the electronic device 620 using a clip, clamp, groove, or other mechanism that grips onto or connects to the electronic device 620. The panel may also or alternatively include a peg, rail, or other mechanism that inserts into an existing cavity in the electronic device 620. The panel may further include a permanent or temporary adhesive, such as a glue, Velcro-like materials, buttons, or zippers.

In some examples, the panel may be configured to hang from a top or back of the electronic device 620 using a hook, string, wrap, ledge, upside down pocket, or other such mechanism for supporting the weight of the panel form the top or back of the electronic device 620.

In some examples, the panel may be integrated with the electronic device 620 itself, and may operable manually or by using the electronic device software. In still further examples, the panel may be integrated with a protective case or carrying case of the electronic device 620.

The panel may be constructed from one or more pieces or parts, which may enable the panel to contract and expand by extending, unfolding, using an accordion-like motion, using sliding or rotating panels, telescoping, unfurling, etc. in one or multiple directions.

In some examples, the angle of the panel with respect to the display screen 622 or with respect to the support surface may be fixed while in use or adjustable to the preference of the user by incorporating folding or bending points, rotating pivots, or linear joints.

In examples in which the reflection-reduction device 600 is not permanently integrated into or attached to the electronic device 620, the panel may be sufficiently thin and otherwise compatible or compact with regard to its width, height, and attachments so as to fit conveniently inside a carrying case or bag that might be used to carry the electronic device 620. In certain examples, the panel may be thin enough to fit within a closed laptop, between the screen 622 and the keyboard.

In some examples, the reflection-reduction device 600 may be made of materials that do not risk thermal damage to the electronic device 620 or to the user while in use by dissipating heat and by reflecting away light where possible.

Method of Construction

Figure 10:
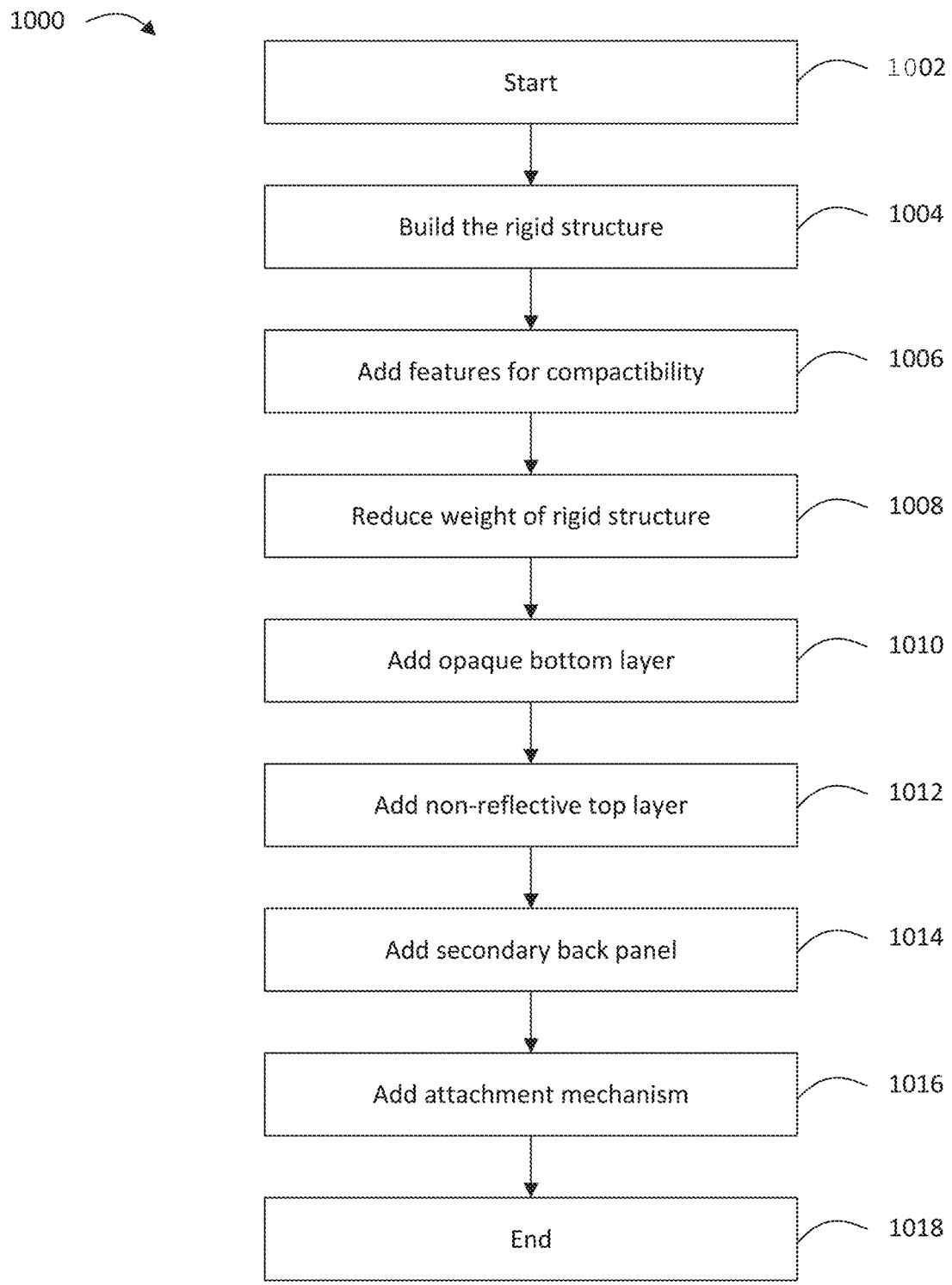
FIG. 10 illustrates an example method of construction of an example reflection-reduction device, according to embodiments of the present disclosure.

FIG. 10 illustrates a flowchart of an example method 1000 according to embodiments of the present disclosure. Method 1000 may enable construction of an ambient light reducing panel according to embodiments of the present disclosure. While the example method 1000 is described with reference to the flowchart illustrated in FIG. 10, many other methods for carrying out the functions described herein may alternatively be used. For example, the order of execution of the blocks may be rearranged or performed in series or parallel with each other, blocks may be changed, eliminated, and/or combined to perform method 1000. Further, because method 1000 is disclosed in connection with the components of FIGS. 1A, 1B, and 2-9, some functions of those components will not be described in detail below.

Method 1000 starts at block 1002.

At block 1004, method 1000 includes building the rigid or semi-rigid structure. This may be done using natural materials like wood or paperboard; various metals and metal alloys; synthetic materials like plastics and ceramics; woven fabrics; and/or any combination of the preceding. The rigid or semi-rigid structure may define the shape of a two-dimensional quadrilateral area of dimensions comparable to the display screen 622. The rigid structure may be less than 20 mm thick—in one example as thin as 1 mm—in order to be thin while still being strong enough to project within 20 degrees deviating from straight while in use.

At block 1006, method 1000 may include adding features for compactability. This can include making the size adjustable while in use, such as by including joints, folds, sliding or rotating panels, pieces that telescope or scissor or unfurl, and more.

At block 1008, method 1000 may include reducing the weight of the rigid or semi-rigid structure. This can include removing portions of the structure that are not structurally required, even to an extreme of only leaving two pieces running along two opposite edges to define those sides from corner to corner.

At block 1010, method 1000 may include adding an opaque bottom layer. If the rigid or semi-rigid structure does not already include an opaque layer (e.g., due to the removal of materials), a lightweight opaque layer may be added. The opaque bottom layer may be affixed to the rigid or semi-rigid structure permanently or so as to be removable, by means of an adhesive, sewing, stapling, grommeting, snap buttons, velcro, or another mechanism, or by shaping the opaque bottom layer as an enclosure to the rigid or semi-rigid structure, as an envelope to a letter, or as an outer band around an inner layer, accommodating the shape and compactability of the rigid or semi-rigid structure and comprising the intended quadrilateral while in use.

At block 1012, method 1000 may include adding a non-reflective or minimally reflective top layer. If the rigid or semi-rigid structure does not include a non-reflective top surface that extends across the structure, a non-reflective layer may be added. The top layer may be configured to absorb 96% or more of visible light. The non-reflective or minimally reflective top layer may be applied or affixed to the rigid or semi-rigid structure using an adhesive, sewing, stapling, grommeting, snap buttons, velcro, etc., or by shaping the material layer as an enclosure to the opaque bottom layer, as an envelope to a letter, or as an outer band around the opaque bottom layer. If the opaque bottom layer is compactible and one or more minimally reflective layers are applied, the minimally reflective layers may accommodate the changing shape of the opaque layer by being removable, by being separate and multiple in number, or by changing shape with the opaque layer.

At block 1014, method 1000 may include adding a secondary back panel configured to protect the rear of the display of the electronic device 620. The secondary opaque back-panel may serve to shield the back of the display screen 622 from light. This secondary back-panel may comprise a separate piece of the invention, unattached to the panel including the rigid or semi-rigid structure, the opaque bottom layer, and the non-reflective top layer. In this embodiment, the builder should add a mechanism for the back-panel to attach to, adhere to, or hang from the back of the display screen 622. Alternatively, the secondary back panel may connect to panel via structural connections that extend around the sides or under the bottom edge of the display screen 622 when in use. In this case, if the secondary back panel either attaches to the display screen 622 or can stand upon the same surface as the display screen 622 or can support the display screen 622, then the secondary back panel may use structural connections to hold the panel in place with respect to itself and thereby the display screen 622. In this embodiment, the connections between the panel and the secondary back panel should be such that when in use, the panel makes an angle between approximately 30 and 75 degrees with the electronic device 620 display screen 622 as it extends from the base of the display screen 622 toward the eye of the user.

At block 1016, method 1000 may include adding an attachment mechanism. If the panel is not already held in place via the secondary back panel, a separate attachment mechanism may be added. The panel may be integrated into the reflection-reduction device 600 itself, or into a case, bag, or piece of furniture that will support or carry the electronic device 620. If the panel is not integrated into an electronic device, case, bag, or piece of furniture, nor supported by a secondary back panel, then it may be a freestanding embodiment. To finish a freestanding embodiment of the panel, the builder should add either support legs or another support attachment to the electronic device 620. Support legs may be singular or multiple and may stand upon the same surface as the electronic device 620 or upon the electronic device 620 itself. If an attachment is used, it may use a clip or clamp or groove that grips onto the reflection-reduction device 600; uses a peg or rail that inserts into an existing cavity in the reflection-reduction device 600; or uses a permanent or temporary adhesive, such as a glue, Velcro-like materials, buttons, or zippers. Regardless of whether the panel is integrated into the electronic device 620; integrated into a bag, case, or piece of furniture; hangs from a secondary back panel; attaches to the reflection-reduction device 600, or uses support legs, the attachment mechanism may provide a mechanism for ensuring that the panel maintains a position and angle aligned along the bottom edge of the display screen 622 and extending upward toward the eye of the user at an angle of between approximately 30 and 75 degrees with respect to the display screen 622. The attachment mechanism may also enable a user to change the angle of use. This may be achieved in various ways, such as by using bendable materials, hinges, rotating joints, multi-positional stay-arms and tethers, etc.

Method 1000 then ends at block 1018.

Instructions for Use

In some examples, the reflection-reduction device 600 of the present disclosure may be operated in the manner disclosed herein. In a first step, a user positioned the electronic device 620 as appropriate for use such as on a desk or table; on the lap of the user seated in a chair; or in the hand of the user. The display screen 622 may be facing away from the sun or light source so that the user when operating the reflection-reduction device 600 is faced in the general direction of the sun or light source.

In a second step, if the reflection-reduction device 600 is compacted, then the user expands the reflection-reduction device 600 to its configuration for use.

In a third step, the user positions the reflection-reduction device 600 with respect to the display screen 622 such that the panel projects from the base of the screen 622 toward the eye of the user. Depending on the exact components and configuration of the reflection-reduction device 600, positioning the reflection-reduction device 600 may vary. The reflection-reduction device may be positioned in a manner to accomplish the goals of the present invention, including improving user experience in an environment with a significant light source and reducing reflected light from that light source onto the screen of the electronic device and/or into the eyes of the user. In preferred embodiments, where the light source is in a typical overhead position, the reflection-reduction device 600 contacts the lower portion of the display screen 622 and extends generally towards the user's eyes.

In a fourth step, if the reflection-reduction device 600 includes a secondary opaque back panel, it should be positioned to protect the back of the display screen 622 from the sun or light source.

In a fifth step, the user may deploy legs and engage attachments as necessary to maintain the position and angle of the reflection-reduction device 600 with respect to the display screen 622.

In a sixth step, if the angle of the panel is adjustable with respect to the display screen 622, the user may adjust the angle of the panel so that the top end (i.e., the end of the panel farthest from the display screen 622) is just barely not visible in the reflection from the display screen 622. The user may the use the electronic device 620 as he or she prefers.

Other Example Embodiments

Figure 14:
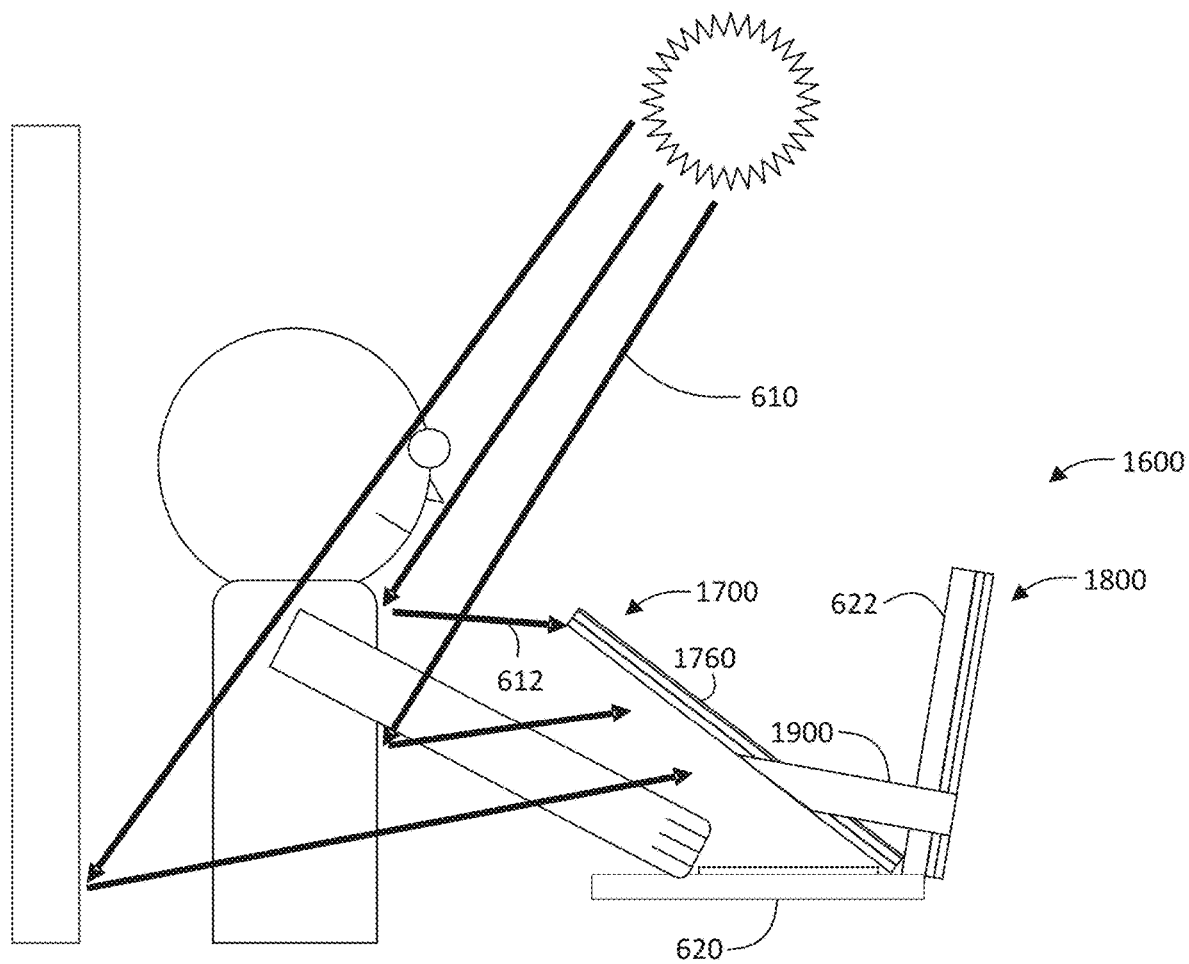
FIG. 14 illustrates the reflection-reduction device of FIG. 11 and the electronic device of FIG. 12 being used by a user.

FIGS. 11 to 19 illustrate another example reflection-reduction device 1600 in accordance with the teachings herein. In particular, FIGS. 11 to 14 depict the reflection-reduction device 1600 in an expanded position. When the reflection-reduction device 1600 is connected to the electronic device 620, as shown in FIG. 14, the reflection-reduction device 1600 is arranged to block light from reaching the screen 622 of the electronic device 620 to prevent and/or otherwise limit specular reflection into the eye of the user.

The reflection-reduction device 1600 of the illustrated example also is collapsible into a collapsed position. The reflection-reduction device 1600 includes a plurality of slits that form predefined fold lines to enable portions of the reflection-reduction device 1600 to fold into the collapsed position. The reflection-reduction device 1600 is collapsed when the reflection-reduction device 1600 is no longer connected to the electronic device 620 for use by the user in order to protect the reflection-reduction device 1600 from being damaged while being stored and/or transported (e.g., in a bag). For example, the reflection-reduction device 1600 has a smaller footprint in the collapsed position than that of the electronic device 620 to deter the reflection-reduction device 1600 from being bent or bowed when being stored next to the electronic device 620.

In this embodiment, the reflection-reduction device 1600 includes a front panel 1700, a back panel 1800, and truss arms 1900. As most clearly shown in FIGS. 13 and 14, the front panel 1700 is configured to extend at an angle of between 30 to 75 degrees from a bottom edge of the screen 622 of the electronic device 620 in a direction toward the eyes of the user. In the illustrated example, the front panel 1700 extends beyond a front edge of the electronic device 620 while remaining below the top edge of the screen 622 to enable the front panel 1700 to prevent and/or otherwise limit specular reflection into the eye of the user without blocking the user's view of the screen 622. The back panel 1800 engages a back surface of the screen 622, and the truss arms 1900 extend between the front panel 1700 and the back panel 1800. As the front panel 1700 tilts toward the eye of the user, the back panel 1800 is pulled against the back of the screen 622 by the truss arms 1900. The rigidity of the screen 622 prevents the back panel 1800 from moving, thereby providing support to the front panel 1700 as the front panel 1700 leans or tilts toward the eye of the user in the expanded position.

In the illustrated example, the truss arms 1900 are integrally formed with the front panel 1700 and couple to the back panel 1800 via, either permanently or temporarily, using any suitable mechanism, such as an adhesive, sewing, stapling, grommeting, snap buttons, Velcro, etc. In other examples, the truss arms 1900 may be integrally formed with the back panel 1800 and/or the truss arms 1900 may couple to the front panel 1700 using any suitable mechanism.

Front Panel

The front panel 1700 of the example reflection-reduction device 1600 of FIGS. 11 to 19 includes a front layer 1710, a front support layer 1730, and a non-reflective layer 1760. The front layer 1710, the front support layer 1730, and the non-reflective layer 1760 are coupled together to form the front panel 1700. For example, the front support layer 1730 is affixed to the front layer 1710 and the non-reflective layer 1760, either permanently or temporarily, using any suitable mechanism, such as an adhesive, sewing, stapling, grommeting, snap buttons, Velcro, etc. In other examples, the front layer 1710, the front support layer 1730, and the non-reflective layer 1760 may be rearranged in any manner that forms the front panel 1700 to be capable of preventing and/or otherwise limiting specular reflection into the eye of the user without blocking the user's view of the screen 622. Further, in other examples, the front panel 1700 may include different layer(s) and/or more or less layer(s), such as a single layer, to form a rigid or semi-rigid, opaque, and non-reflective panel that prevents and/or otherwise limits specular reflection. For example, the front panel 1700 may not include the front layer 1710 if one of the other layer(s) forming the front panel 1700 is opaque.

Figure 17:
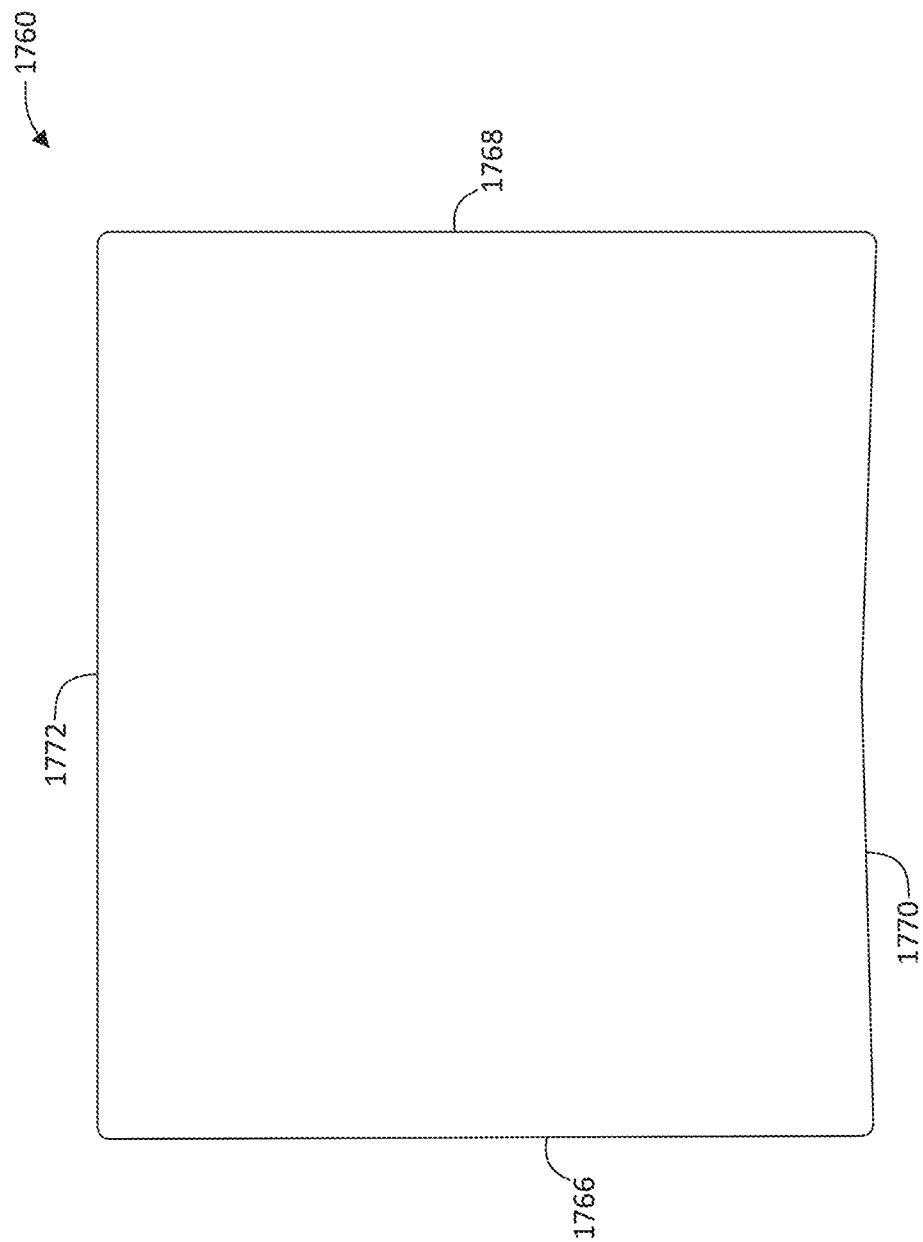
FIG. 17 depicts a non-reflective layer of a front panel of the reflection-reduction device of FIG. 11.

The front panel 1700 of the illustrated example is configured to bend or curve slightly toward the user when the reflection-reduction device 1600 is in the expanded position and coupled to the electronic device 620 in order to prevent the front panel 1700 from sagging away from the eyes of the user. Additionally, the front panel 1700 of the illustrated example includes a scallop-cut bottom edge that increases the rigidity of the front panel 1700 when the reflection-reduction device 1600 is in the expanded position and coupled to the electronic device 620. The scallop-cut bottom edge has an apex that is centrally located with respect to the width of the front panel 1700. In other words, the bottom edge of the front panel 1700 has a "A" shape with the height of the scallop cut being, for example, about 5 millimeters. The scallop cut along the bottom edge increases the rigidity of the front panel 1700 as the front panel 1700 extends outward in the expanded position. An exemplary scallop cut is depicted in FIG. 17.

As shown in FIGS. 11 to 14, the front support layer 1730 is positioned between the front layer 1710 and the non-reflective layer 1760. The front layer 1710 includes an outer surface 1712 and an opposing inner surface 1714. The non-reflective layer 1760 includes an outer surface 1762 and an opposing inner surface 1764. The inner surface 1714 of the front layer 1710 engages a first side 1732 of the front support layer 1730, and the inner surface 1764 of the non-reflective layer an opposing second side 1734 of the front support layer 1730.

Figure 15:
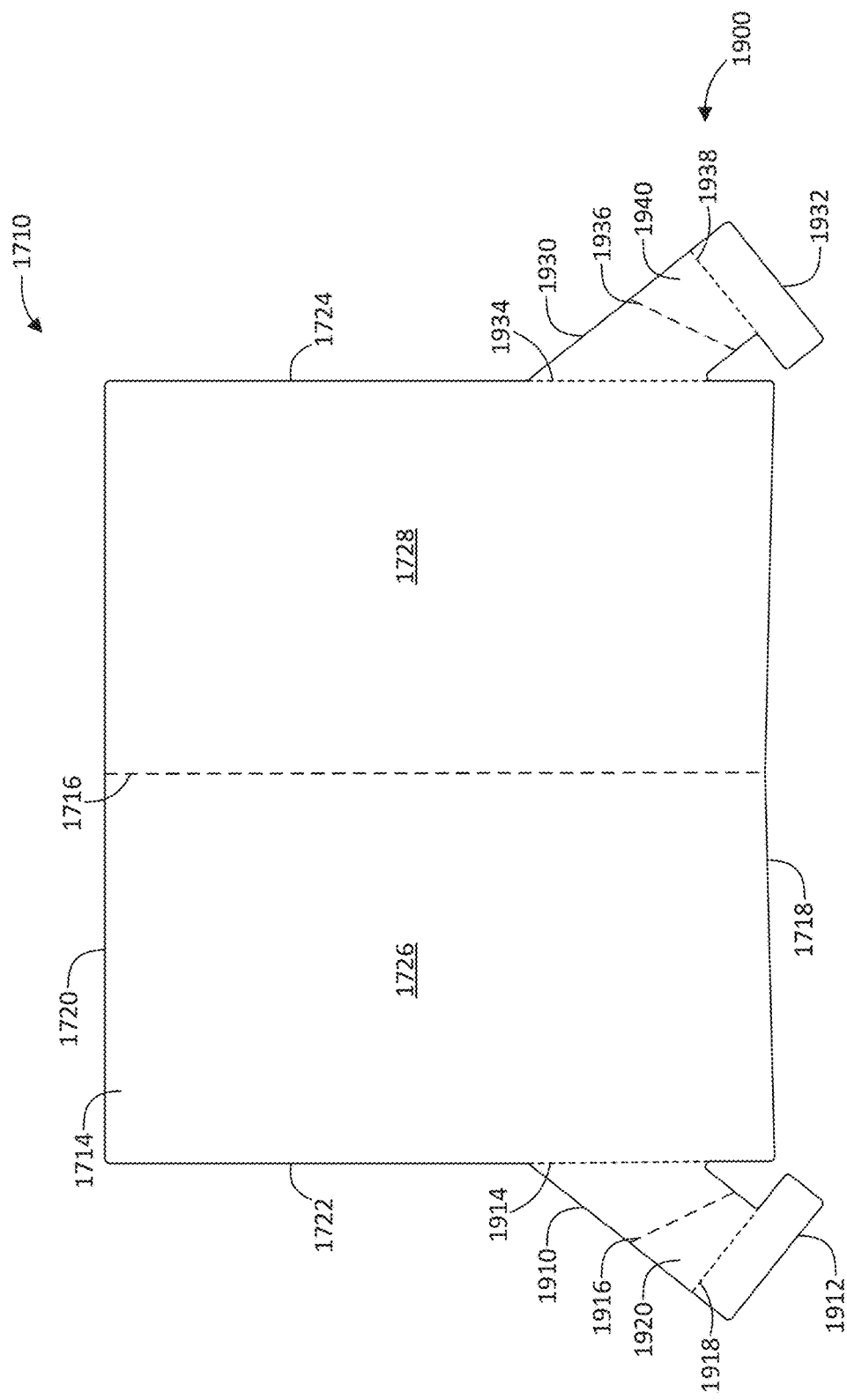
FIG. 15 depicts a front layer of a front panel of the reflection-reduction device of FIG. 11.

Turning to FIG. 15, the front layer 1710 has a rectangular shape. In one example, the front layer 1710 has a width of 410 millimeters and height of 350 millimeters. In another example, the front layer 1710 has a width of 380 millimeters and height of 320 millimeters. In the illustrated example, the front layer 1710 has rounded corners with a 5 millimeter radius. In some examples, the front layer 1710 is formed of a layer (e.g., a 10 millimeter layer) of vinyl material with the outer surface 1712 being a relatively light color (e.g., white) that absorbs a minimal amount of heat.

In the illustrated example, a vertical score line 1716 extends along the outer surface 1712 of the front layer 1710. The vertical score line 1716 enables the front panel 1700 to (1) bend or curve slightly toward the user into a more rigid shape to prevent the front panel 1700 from sagging when in the expanded position and (2) to fold (e.g., in half) as the reflection-reduction device 1600 folds into the collapsed position. The vertical score line 1716 extends from a bottom edge 1718 and an opposing top edge 1720 centrally between opposing side edges 1722, 1724 of the front layer 1710. The vertical score line 1716 divides the front layer 1710 into a first portion 1726 and a second portion 1728 opposite the first portion 1726.

The bottom edge 1718 is a scallop-cut edge having a centrally-located apex from which the vertical score line 1716 extends. In other words, the bottom edge 1718 has a "A" shape. In the illustrated example, the height of the scallop cut is about 5 millimeters. The scallop cut of the bottom edge 1718 of the front layer 1710 forms, at least in part, the scallop-cut edge of the front panel 1700.

Figure 16:
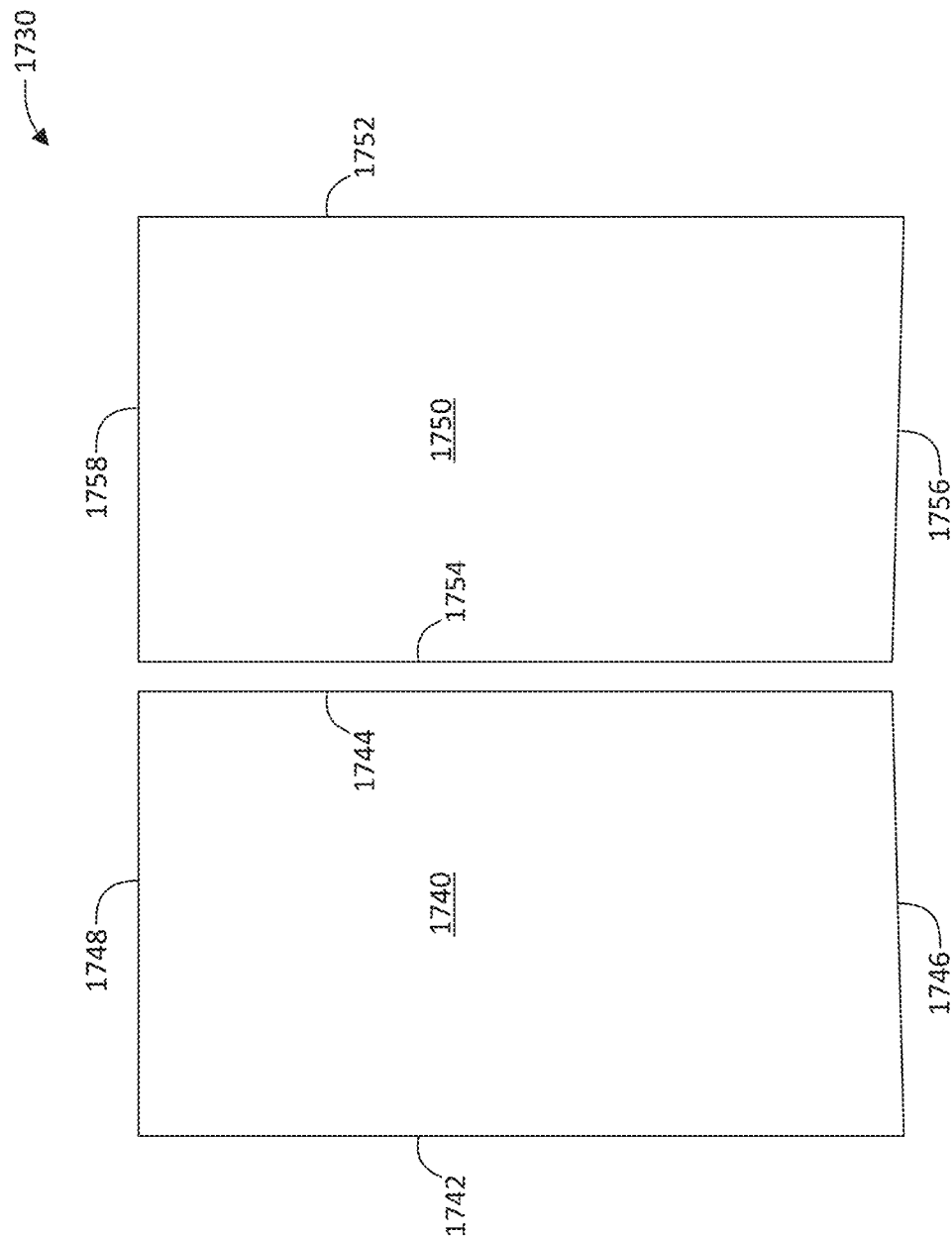
FIG. 16 illustrates support panels of a front panel of the reflection-reduction device of FIG. 11.

FIG. 16 depicts front support panels 1740, 1750 of the front support layer 1730. The front support panels 1740, 1750 are formed of rigid or semi-rigid material that provides rigidity to the front panel 1700 in order to facilitate the front panel 1700 to extend toward the eye of the user without significant sagging. The front support panels 1740, 1750 are formed of natural materials (e.g., wood, paperboard, etc.), metals, plastics, ceramics, woven fabrics, any other rigid or semi-rigid material, and/or combinations thereof.

The front support panels 1740, 1750 are coupled to the inner surface 1714 of the front layer 1710. In particular, the front support panel 1740 is coupled to the first portion 1726 of the front layer 1710, and the front support panel 1750 is coupled to the second portion 1728 of the front layer 1710. Each of the front support panels 1740, 1750 are spaced apart from the vertical score line 1716 to enable the front panel 1700 to fold along the vertical score line 1716. That is, the front support panels 1740, 1750 do not overlap with the vertical score line 1716 so that the front support panels 1740, 1750 do not inhibit folding of the front panel 1700 along the vertical score line 1716.

The front support panel 1740 includes opposing side edges 1742, 1744, a bottom edge 1746, and an opposing top edge 1748. The side edge 1742 aligns with and/or is adjacent to the side edge 1722, the side edge 1744 is adjacent to the vertical score line 1716, the bottom edge 1746 aligns with and/or is adjacent to a portion of the bottom edge 1718, and the top edge 1748 aligns with and/or is adjacent to a portion of the top edge 1720. The bottom edge 1746 angles upward (e.g., by about 5 millimeters) from the side edge 1742 to the opposing side edge 1744 to at least partially form the scallop-cut edge of the front panel 1700.

The front support panel 1750 includes opposing side edges 1752, 1754, a bottom edge 1756, and an opposing top edge 1758. The side edge 1752 aligns with and/or is adjacent to the side edge 1724, the side edge 1754 is adjacent to the vertical score line 1716, the bottom edge 1756 aligns with and/or is adjacent to a portion of the bottom edge 1718, and the top edge 1758 aligns with and/or is adjacent to a portion of the top edge 1720. The bottom edge 1756 angles upward (e.g., by about 5 millimeters) from the side edge 1752 to the opposing side edge 1754 to at least partially form the scallop-cut edge of the front panel 1700.

FIG. 17 further depicts the non-reflective layer 1760 that includes opposing side edges 1766, 1768, a bottom edge 1770, and an opposing top edge 1772. The side edge 1766 aligns with and/or is adjacent to the side edge 1722, the side edge 1768 is aligns with and/or is adjacent to the side edge 1722, the bottom edge 1770 has a scallop cut and aligns with and/or is adjacent to the bottom edge 1718, and the top edge 1772 aligns with and/or is adjacent to the top edge 1720. The bottom edge 1770 has a scallop cut to at least partially form the scallop-cut edge of the front panel 1700. In the illustrated example, the non-reflective layer 1760 is formed from a single panel. In other examples, the non-reflective layer 1760 is formed from two panels that are arranged in a side-by-side manner with the vertical score line 1716 separating the two panels. For example, the two panels of the non-reflective layer 1760 are in arranged in a manner similar to that of the front support panels 1740, 1750 of the front support layer 1730. Such configuration facilitates the front panel 1710 in folding into the collapsed position.

Figure 11:
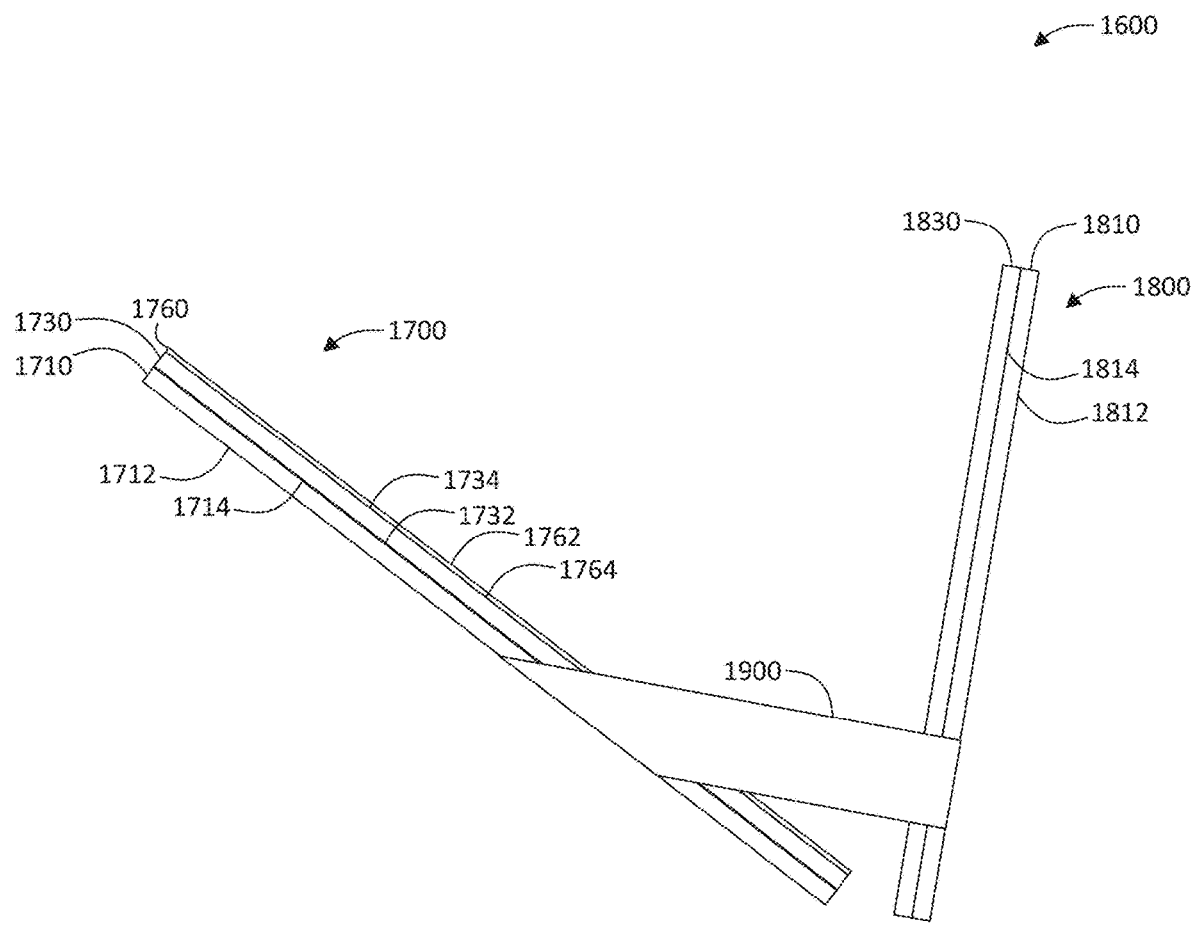
FIG. 11 illustrated another example reflection-reduction device in accordance with the present disclosure.
Figure 12:
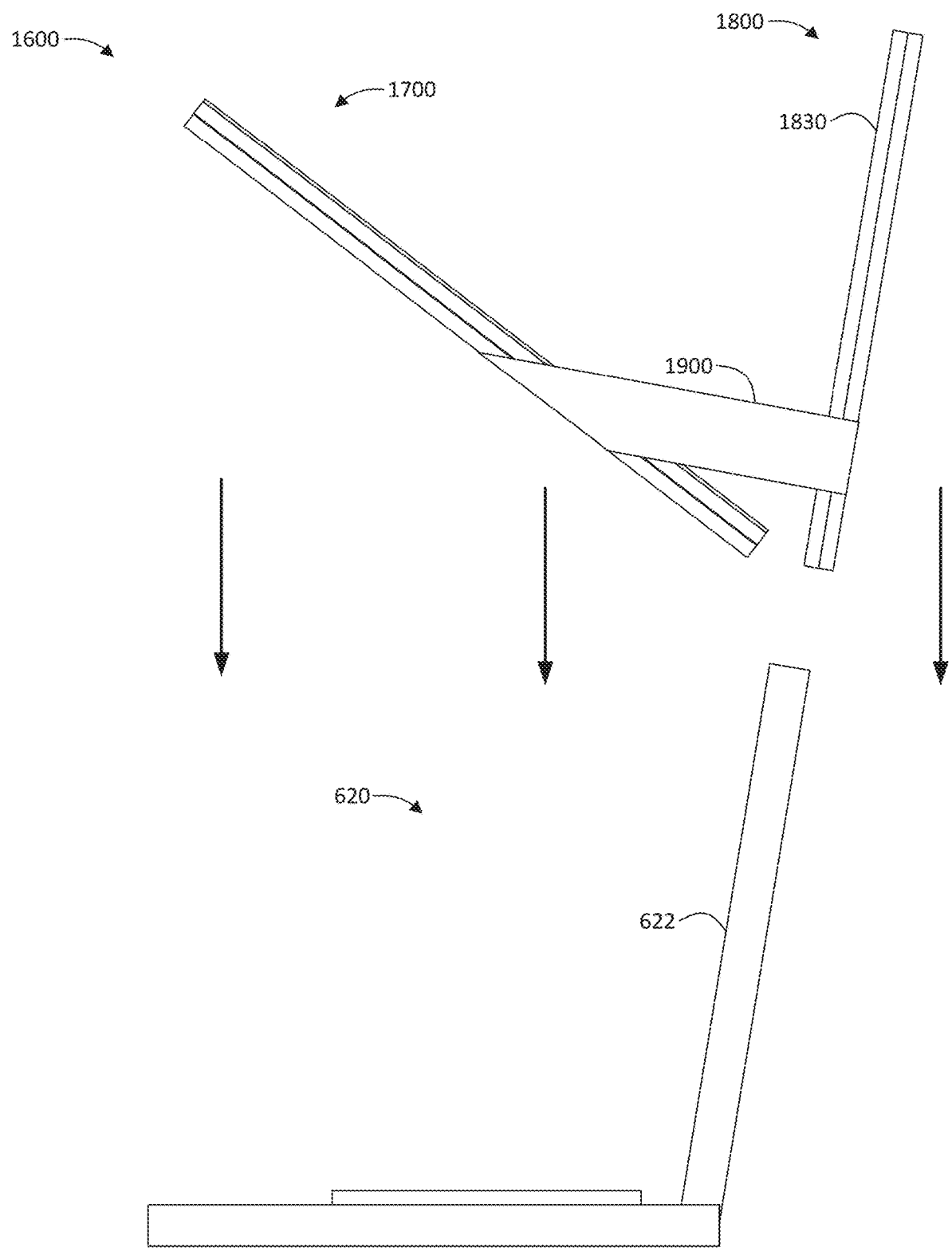
FIG. 12 depicts the reflection-reduction device of FIG. 11 being positioned on an electronic device.
Figure 13:
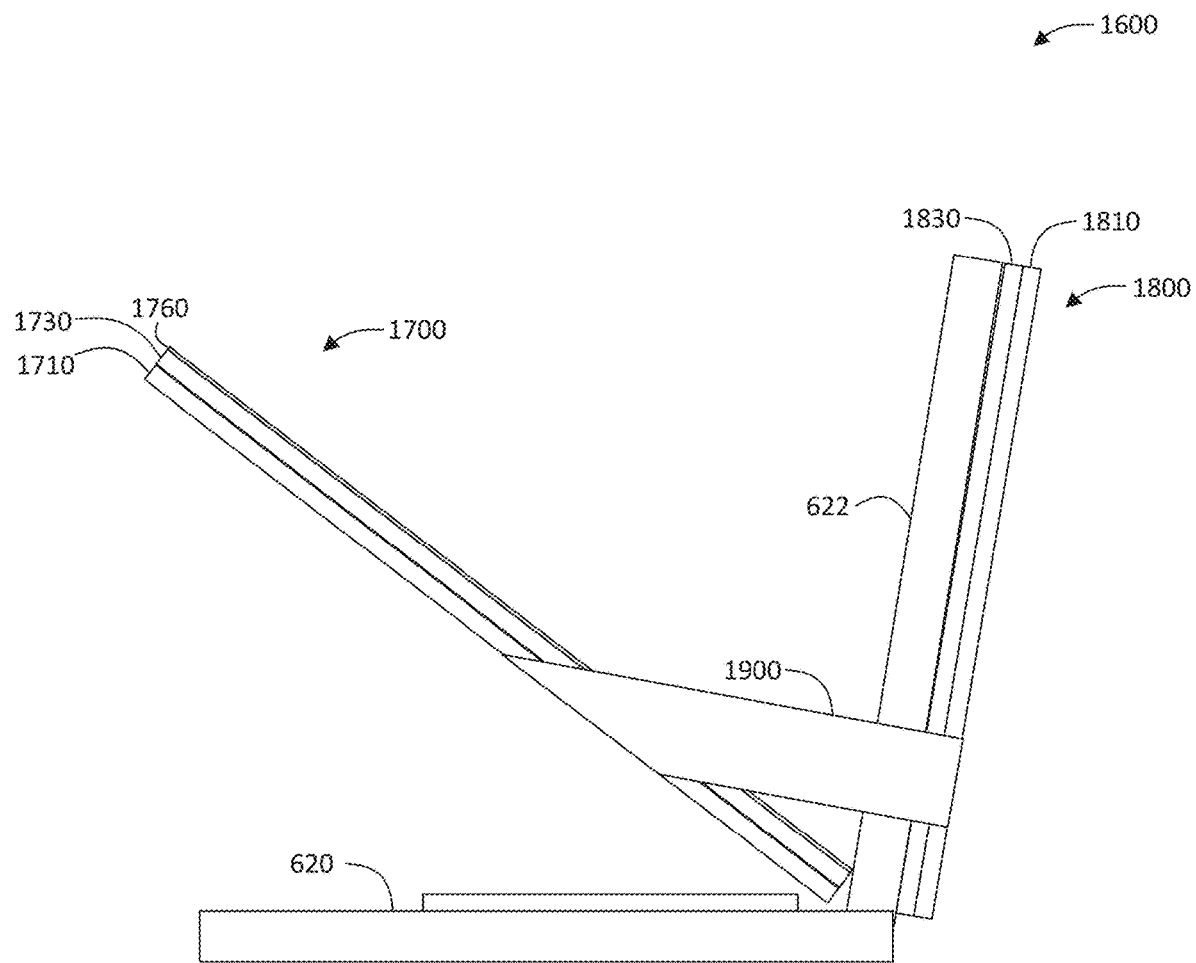
FIG. 13 illustrates the reflection-reduction device of FIG. 11 positioned on the electronic device of FIG. 12.

As illustrated in FIG. 11, the inner surface 1764 of the non-reflective layer 1760 is fixed to the second side 1734 of the front support layer 1730. The outer surface 1762 of the non-reflective layer 1760 forms an upper surface of the front panel 1710 and face toward the screen 622 of the electronic device 620 when the reflection-reduction device 1600 is in the expanded position and coupled to the electronic device 620. The outer surface 1762 of the non-reflective layer 1760 is formed of non-reflective or minimally reflective material that prevents and/or otherwise inhibits light from reflecting off the reflection-reduction device 1600, onto the screen 622, and into the user's eyes. The non-reflective or minimally reflective material includes paint (e.g., Stuart Semple's Black 2.0 and Black 3.0), dyes, fabric (e.g., black velvet), coatings (e.g., Surrey NanoSystems Vantablack), any other non-reflective or minimally reflective material, and/or combinations thereof. In some examples, the non-reflective layer 1760 may absorb more than 96% of visible light (i.e., wavelength 380 to 740 nm) in sunlit conditions (i.e., less than 100,000 lux). Further, in some examples, the non-reflective layer 1760 may be configured to absorb greater than 99% of visible light.

Back Panel

The back panel 1800 of the reflection-reduction device 1600 of FIGS. 11 to 19 includes a back layer 1810 and a back support layer 1830. The back layer 1810 and the back support layer 1830 are coupled together to form the back panel 1800. For example, the back layer 1810 is affixed to the back support layer 1830, either permanently or temporarily, using any suitable mechanism, such as an adhesive, sewing, stapling, grommeting, snap buttons, Velcro, etc.

Figure 18:
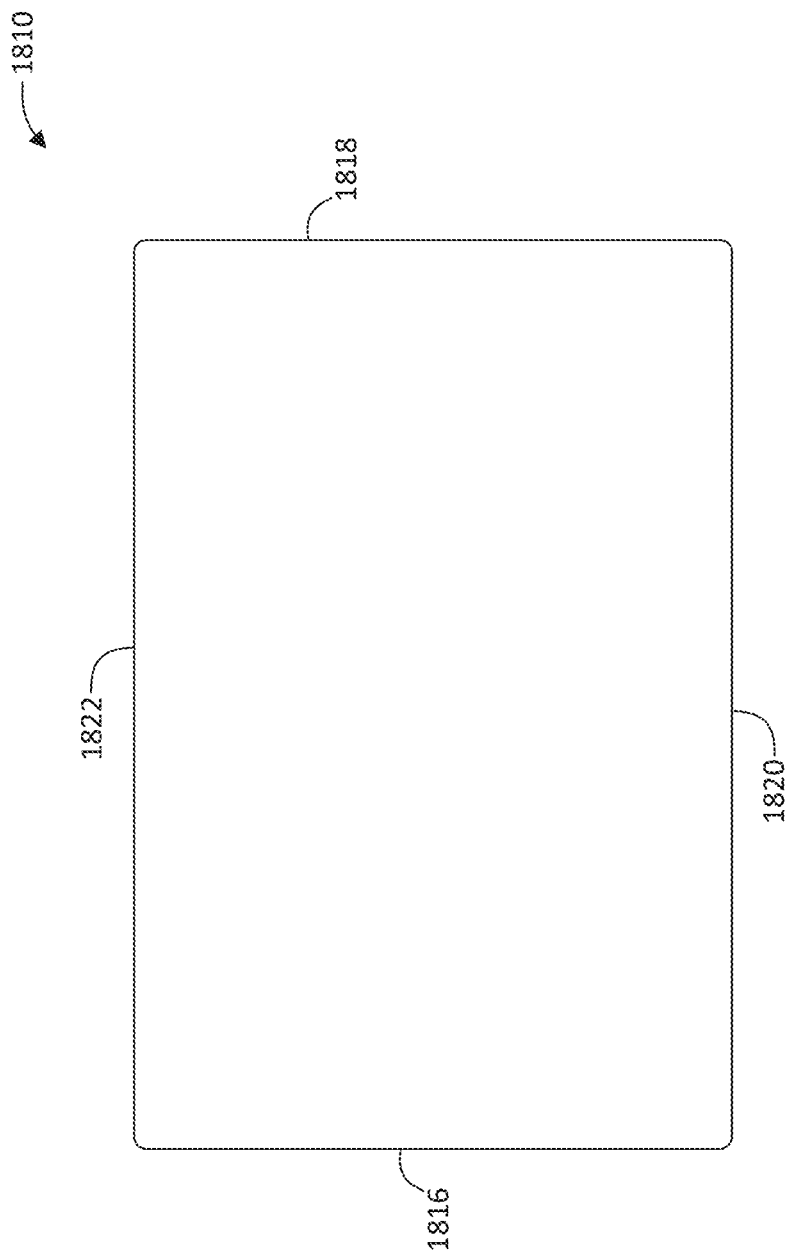
FIG. 18 illustrates a back layer of a back panel of the reflection-reduction device of FIG. 11.

Turning to FIG. 18, the back layer 1810 in this embodiment is substantially rectangular. The back layer 1810 has an outer surface 1812 and inner surface 1814 opposite to the outer surface 1812. The inner surface 1814 is fixed to the back support layer 1830. The back layer 1810 also includes opposing side edges 1816, 1818, a bottom edge 1820, and a top edge 1822 opposite the bottom edge 1820.

The back layer 1810 may have dimensions comparable to (e.g., slightly larger) or the same as the dimensions and/or the aspect ratio of the screen 622 of the electronic device 620. In one example, the back layer 1810 has a width of 410 millimeters and height of 270 millimeters. In another example, the back layer 1810 has a width of 380 millimeters and height of 250 millimeters. Further, in the illustrated example, the front layer 1710 has rounded corners with a 5 millimeter radius.

The back layer 1810 is opaque to block light from passing through to the back of the screen 622 of the electronic device 620 when the reflection-reduction device 1600 is coupled to the electronic device for use. In some examples, the back layer 1810 is formed of a layer (e.g., a 10 millimeter layer) of vinyl material with the outer surface 1812 being a relatively light color (e.g., white) that absorbs a minimal amount of heat.

Figure 19:
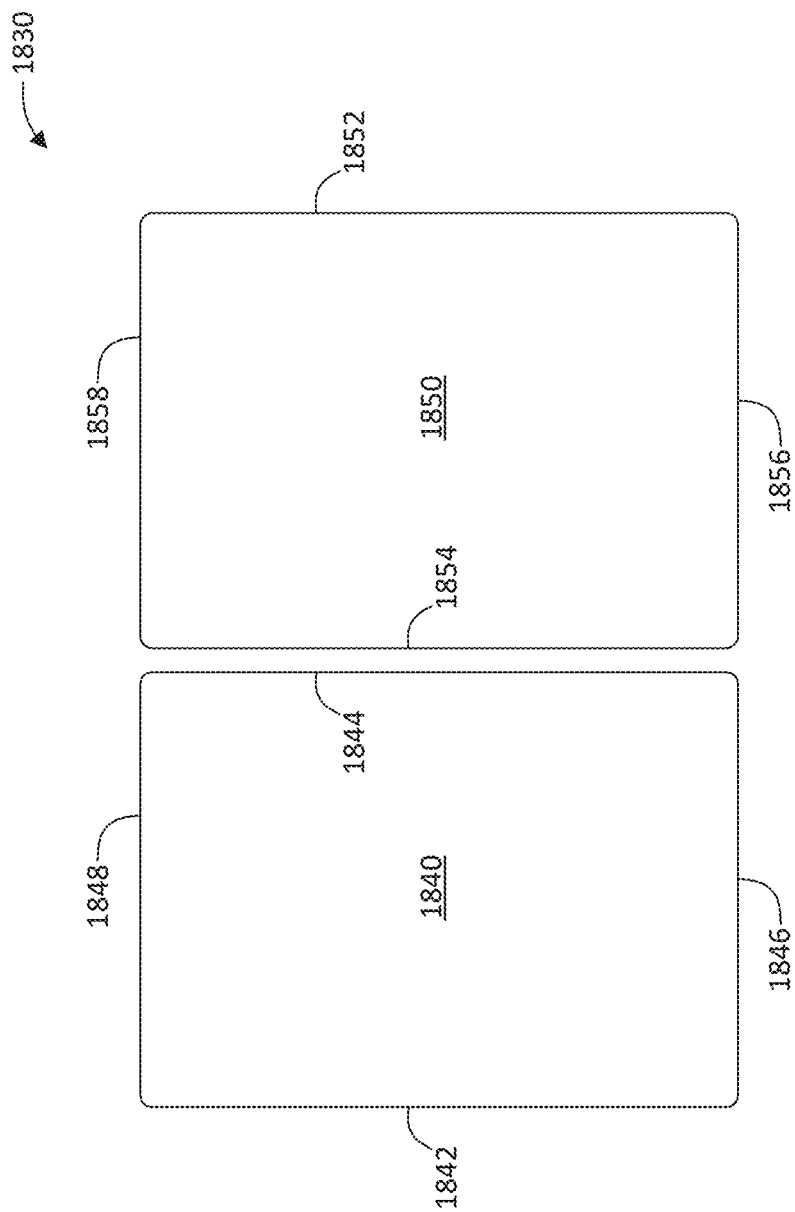
FIG. 19 illustrates support panels of a back panel of the reflection-reduction device of FIG. 11.

FIG. 19 depicts back support panels 1840, 1850 of the back support layer 1830. The back support panels 1840, 1850 are formed of rigid or semi-rigid material that provides rigidity to the back panel 1800 in order to facilitate the back panel 1800 in supporting the reflection-reduction device 1600 as the front panel 1700 leans toward the eye of the user. The back support panels 1840, 1850 are formed of natural materials (e.g., wood, paperboard, etc.), metals, plastics, ceramics, woven fabrics, any other rigid or semi-rigid material, and/or combinations thereof. The back support panels 1840, 1850 of the illustrated example are coupled to the inner surface 1814 of the back layer 1810 in a side-by-side manner. A gap is formed between the back support panels 1840, 1850 that forms a predefined fold line to enable the back panel 1800 to fold (e.g., in half) when the reflection-reduction device 1600 is collapsed to the collapsed position.

The back support panel 1840 includes opposing side edges 1842, 1844, a bottom edge 1846, and an opposing top edge 1848. The side edge 1842 aligns with and/or is adjacent to the side edge 1816, the side edge 1844 is adjacent to the back support panel 1850, the bottom edge 1846 aligns with and/or is adjacent to a portion of the bottom edge 1820, and the top edge 1848 aligns with and/or is adjacent to a portion of the top edge 1822.

The back support panel 1850 includes opposing side edges 1852, 1854, a bottom edge 1856, and an opposing top edge 1858. The side edge 1852 aligns with and/or is adjacent to the side edge 1818, the side edge 1854 is adjacent to the back support panel 1840, the bottom edge 1856 aligns with and/or is adjacent to a portion of the bottom edge 1820, and the top edge 1858 aligns with and/or is adjacent to a portion of the top edge 1822.

Truss Arms

Returning to FIG. 15, the truss arms 1900 of the illustrated example include a first arm 1910 and a second arm 1930 opposite to the first arm 1910. In the illustrated example, the truss arms 1900 are integrally formed with the front layer 1710 of the front panel 1700. In other examples, the truss arms 1900 are affixed to the front panel 1700, either permanently or temporarily, using any suitable mechanism, such as an adhesive, sewing, stapling, grommeting, snap buttons, Velcro, etc. The truss arms 1900 are support arms that are shaped, positioned, and oriented to enable the front panel 1700 to extend and lean in a direction toward the eye of the user when the back panel 1800 engages the back of the screen 622 of the electronic device 620.

The first arm 1910 extends from the side edge 1722 of the front layer 1710. The first arm 1910 includes a proximal end that extends from the side edge 1722 and a distal end opposite the proximal end. The first arm 1910 includes a tab 1912 at the distal end. The tab 1912 extends transversely beyond the other portion of the first arm 1910 in an inward direction such that the width of the tab 1912 is greater than the other portion of the first arm 1910. The tab 1912 is configured to affix to the back panel 1800, either permanently or temporarily, using any suitable mechanism, such as an adhesive, sewing, stapling, grommeting, snap buttons, Velcro, etc. The tab 1912 is affixed to the back panel 1800 to enable the first arm 1910 to extend between the front panel 1700 and the back panel 1800 in a manner that enables the front panel 1700 to extend from the bottom of the display screen 622 toward the eyes of the user. In the illustrated example, the first arm 1910 extends at an angle (e.g., 38 degrees) relative to the side edge 1722 that causes the front panel 1700 to extend in a direction toward the eyes of the user when the reflection-reduction device 1600 is in the expanded position and coupled to the electronic device 620.

As illustrated in FIG. 15, the first arm 1910 includes a first score line 1914, a second score line 1916, and a third score line 1918. The score lines 1914, 1916, 1918 enable the first arm 1910 to fold into a collapsed position. The first score line 1914 extends between the front layer 1710 and the first arm 1910 along the side edge 1722. The third score line 1918 extends along and adjacent to the tab 1912 of the first arm 1910. The second score line 1916 extends a width of the first arm 1910 at an angle (e.g., 142 degrees) relative to the third score line 1918. In the illustrated example, the first score line 1914 and the third score line 1918 are located on an inner side 1920 of the first arm 1910 that is configured to face the electronic device 620 when the reflection-reduction device 1600 is in the expanded position and coupled to the electronic device 620. The second score line 1916 located on an opposing outer side of the first arm 1910 that is configured to face away from the electronic device 620 when the reflection-reduction device 1600 is in the expanded position and coupled to the electronic device 620.

Similarly, the second arm 1930 extends from the side edge 1724 of the front layer 1710. The second arm 1930 includes a proximal end that extends from the side edge 1724 and a distal end opposite the proximal end. The second arm 1930 includes a tab 1932 at the distal end. The tab 1932 extends transversely beyond the other portion of the second arm 1930 in an inward direction such that the width of the tab 1932 is greater than the other portion of the second arm 1930. The tab 1932 is configured to affix to the back panel 1800, either permanently or temporarily, using any suitable mechanism, such as an adhesive, sewing, stapling, grommeting, snap buttons, Velcro, etc. The tab 1932 is affixed to the back panel 1800 to enable the second arm 1930 to extend between the front panel 1700 and the back panel 1800 in a manner that enables the front panel 1700 to extend from the bottom of the display screen 622 toward the eyes of the user. In the illustrated example, the second arm 1930 extends at an angle (e.g., 38 degrees) relative to the side edge 1724 that causes the front panel 1700 to extend in a direction toward the eyes of the user when the reflection-reduction device 1600 is in the expanded position and coupled to the electronic device 620.

As illustrated in FIG. 15, the second arm 1930 includes a first score line 1934, a second score line 1936, and a third score line 1938. The score lines 1934, 1936, 1938 enable the second arm 1930 to fold into a collapsed position. The first score line 1934 extends between the front layer 1710 and the second arm 1930 along the side edge 1724. The third score line 1938 extends along and adjacent to the tab 1932 of the second arm 1930. The second score line 1936 extends a width of the second arm 1930 at an angle (e.g., 142 degrees) relative to the third score line 1938. In the illustrated example, the first score line 1934 and the third score line 1938 are located on an inner side 1940 of the second arm 1930 that is configured to face the electronic device 620 when the reflection-reduction device 1600 is in the expanded position and coupled to the electronic device 620. The second score line 1936 located on an opposing outer side of the second arm 1930 that is configured to face away from the electronic device 620 when the reflection-reduction device 1600 is in the expanded position and coupled to the electronic device 620. The score lines discussed herein can be utilized, in some embodiments, to assist the user in positioning the reflection-deduction device to a suitable and/or ideal angle for use with an electronic device. In these embodiments, the first and second arms are made of a sufficiently rigid or semi-rigid material to allow the arms to bear the weight necessary for modifying the angle of the reflection-deduction device.

In one example, each of the first and second arms 1910, 1930 has a total length of 135.4 millimeters, the tab has a length of 25 millimeters, the tab has a width of 80 millimeters, and the other portion of the first arm 1910 has a width of 55.4 millimeters. In another example, each of the first and second arms 1910, 1930 has a total length of 126.3 millimeters, the tab has a length of 25 millimeters, the tab has a width of 72.9 millimeters, and the other portion of the first arm 1910 has a width of 50.5 millimeters.

Method of Use

Figure 20:
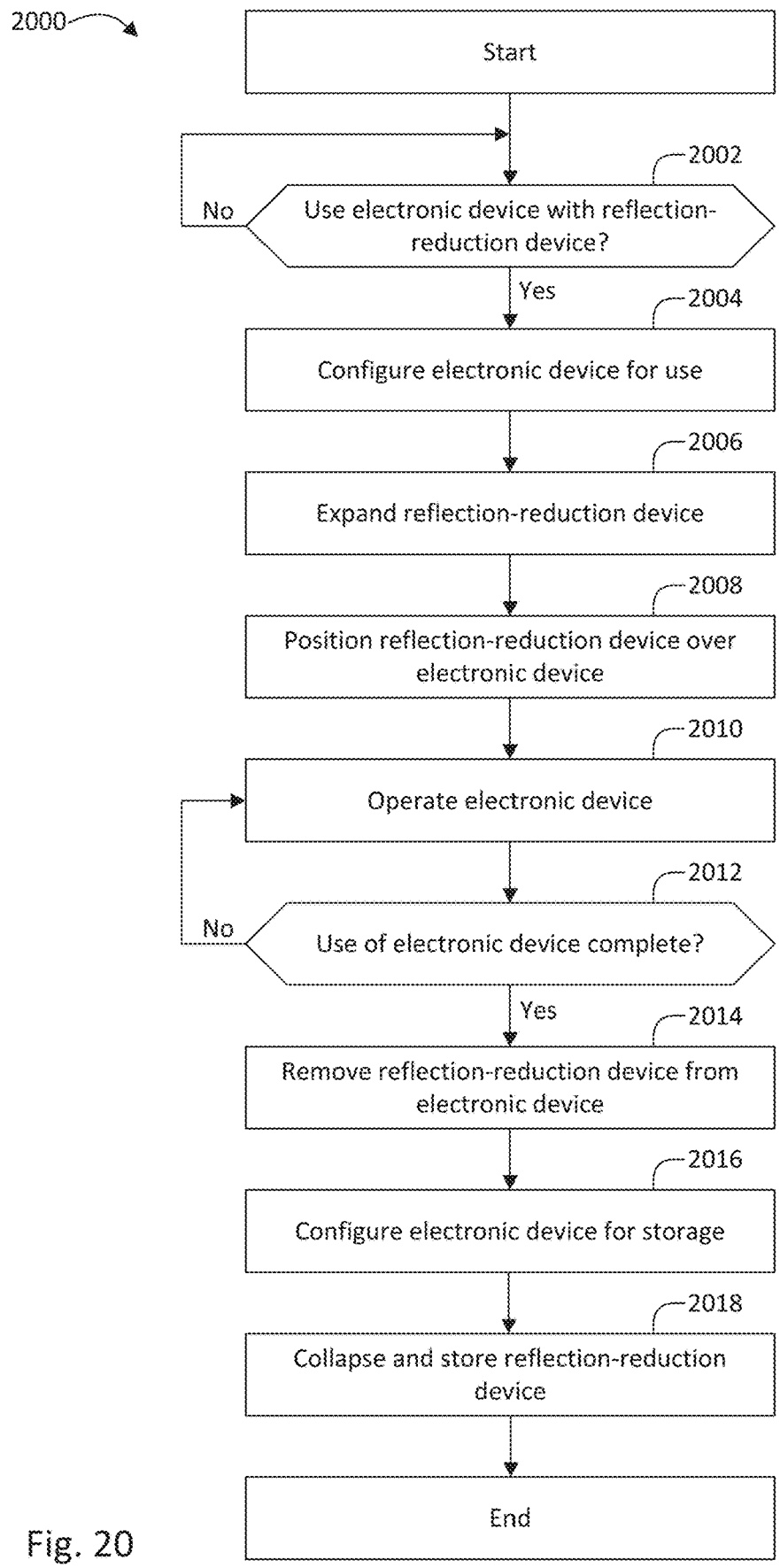
FIG. 20 illustrates an example method for using an example reflection-reduction device with an electronic device in accordance with the present disclosure.

FIG. 20 illustrates a flowchart of an example method 2000 to use a reflection-reduction device with an electronic device in accordance with the present disclosure. While the example method 2000 is described with reference to the flowchart illustrated in FIG. 20, many other methods for carrying out the functions described herein may alternatively be used. For example, the order of execution of the blocks may be rearranged or performed in series or parallel with each other, blocks may be changed, eliminated, and/or combined to perform method 2000. Further, because method 2000 is disclosed in connection with the components of FIGS. 11 to 19, some functions of those components will not be described in detail below.

At block 2002, the user determines whether to use the electronic device 620 with the reflection-reduction device 1600. In response to the user selecting not to use the electronic device 620 with the reflection-reduction device 1600, the method 2000 remains at block 2002. Otherwise, in response to the user selecting to use the electronic device 620 with the reflection-reduction device 1600, the method 2000 proceeds to block 2004.

At block 2004, the user configures the electronic device 620 for use (e.g., by opening the electronic device 620). At block 2006, the user expands the reflection-reduction device 1600 to the expanded position. At block 2008, the user positions the reflection-reduction device 1600 over the electronic device 620. At block 2010, the user operates the electronic device 620 with the reflection-reduction device 1600 blocking light from reaching the screen 622 of the electronic device 620 to prevent and/or otherwise limit specular reflection into the eye of the user.

At block 2012, the user determines whether their use of the electronic device 620 is complete. In response to the user determining that use of the electronic device 620 is not complete, the method 2000 returns to block 2010. Otherwise, in response to the user determining that use of the electronic device 620 is complete, the method 2000 proceeds to block 2014.

At block 2014, the user removes the reflection-reduction device 1600 from the computing device 620. At block 2016, the user configures the electronic device 620 for storage (e.g., by closing the electronic device 620). At block 2018, the user collapses the reflection-reduction device 1600 and stores the reflection-reduction device 1600 in the collapsed position.

Other Example Embodiments

FIGS. 21 to 36 illustrate other example reflection-reduction devices in accordance with the teachings herein. Each of the reflection-reduction devices in FIGS. 21 to 36 includes a panel that is identical and/or substantially similar to the front panel 1700 of FIGS. 11 to 17. In the illustrated examples, the panel of each of the reflection-reduction devices in FIGS. 21 to 36 includes a front layer and a non-reflective layer that is identical and/or substantially similar to the front layer 1710 and the non-reflective layer 1760, respectively, of the front panel 1700. In some examples, the panel of one or more of the reflection-reduction devices in FIGS. 21 to 36 includes a support layer that is identical and/or substantially similar to the front support layer 1730, respectively, of the front panel 1700. As such, only certain aspects of the panel of each of the reflection-reduction devices in FIGS. 21 to 36 are described below for brevity. In other examples of the reflection-reduction devices disclosed below, the front layer, the non-reflective layer, and/or the front support layer may be rearranged in any manner that forms a front panel capable of preventing and/or otherwise limiting specular reflection into the eye of the user without blocking the user's view of the screen 622. In other examples of the reflection-reduction devices disclosed below, the front panel may include different layer(s) and/or more or less layer(s), such as a single layer, to form a rigid or semi-rigid, opaque, and non-reflective panel that prevents and/or otherwise limits specular reflection. For example, front panels disclosed below may not include a panel similar to the front layer 1710 of FIGS. 11 to 17 if one of the other layer(s) forming the front panel is opaque.

The panel of each of the reflection-reduction devices in FIGS. 21 to 36 is arranged to block light from reaching the screen 622 of the electronic device 620 to prevent and/or otherwise limit specular reflection into the eye of the user. For example, the panel is configured to extend at an angle of between 30 to 75 degrees from a bottom edge of the screen 622 of the electronic device 620 in a direction toward the eyes of the user. In some examples, the panel of one or more of the reflection-reduction devices depicted in FIGS. 21 to 36 is configured extend beyond a front edge of the electronic device 620 while remaining below the top edge of the screen 622 to facilitate the panel in preventing and/or otherwise limiting specular reflection into the eye of the user.

Some examples of the reflection-reduction devices of FIGS. 21 to 36 are collapsible in order to protect the reflection-reduction device from being damaged during storage and/or transport. For example, some of the reflection-reduction devices include a plurality of slits that form predefined fold lines to enable portions of those reflection-reduction devices into a collapsed position.

In some examples, the panel of the reflection-reduction devices of FIGS. 21 to 36 include a vertical score line that enables the panel to (1) bend or curve slightly toward the user into a more rigid shape to prevent the panel from sagging when in the expanded position and/or (2) to fold (e.g., in half) to enable the reflection-reduction device to fold into the collapsed position.

Additionally or alternatively, the panel of some of the reflection-reduction devices of FIGS. 21 to 36 include a scallop-cut bottom edge that increases the rigidity of the panel when the panel is extended outwardly at an angle toward the eyes of the user.

Further, some examples of the reflection-reduction devices of FIGS. 21 to 36 include a panel that includes one or more front support panels. The front support panels are formed of rigid or semi-rigid material that provide rigidity to the panel in order to facilitate the panel in extending toward the eye of the user without significant sagging. Additionally or alternatively, some panels of the reflection-reduction devices of FIGS. 21 to 36 include a wire frame for the non-reflective layer to provide rigidity to the non-reflective layer as it extends outwardly toward the eyes of the user.

Figure 21:
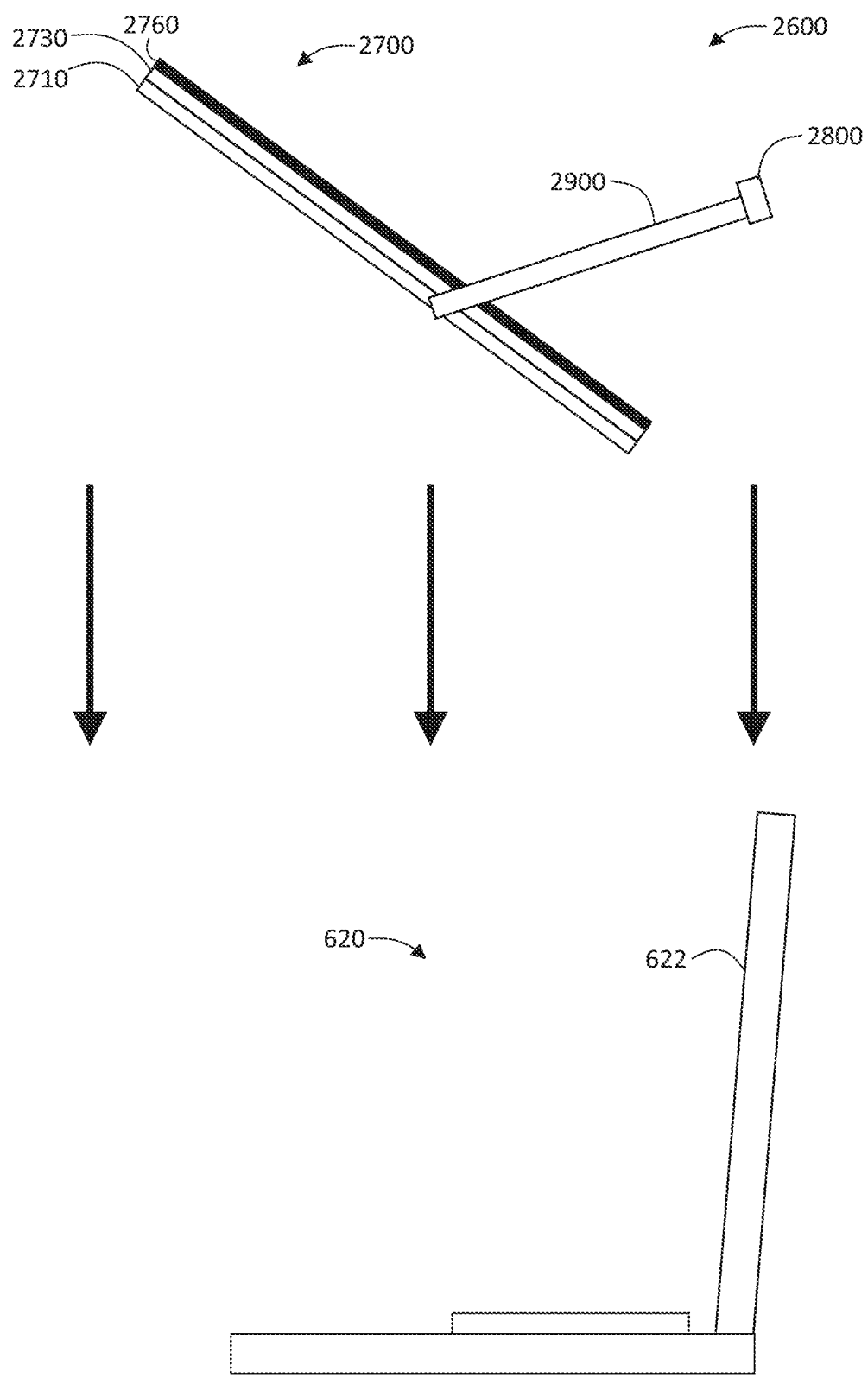
FIG. 21 illustrates another example reflection-reduction device being positioned on an electronic device in accordance with the present disclosure.
Figure 22:
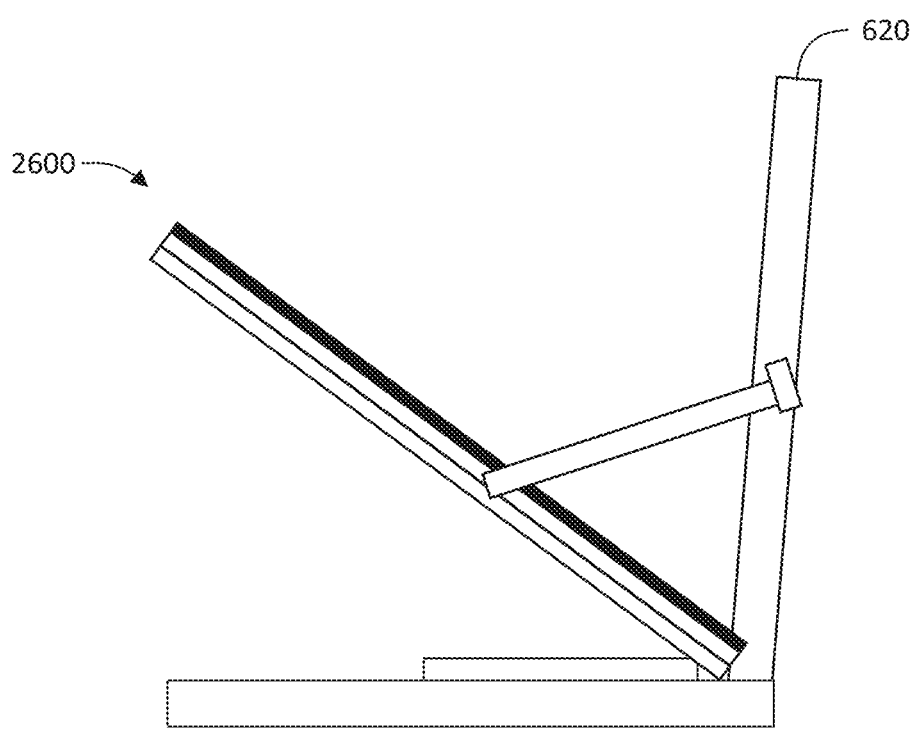
FIG. 22 illustrates the reflection-reduction device of FIG. 21 positioned on the electronic device.

FIGS. 21 and 22 depict an example reflection-reduction device 2600 in accordance with the teachings herein. More specifically, FIG. 21 depicts the reflection-reduction device 2600 being positioned on and/or coupled to the electronic device 620, and FIG. 22 depicts the reflection-reduction device 2600 positioned on and/or coupled to the electronic device 620.

The reflection-reduction device 2600 includes a panel 2700, one or more support arms 2900, and one or more attachment mechanisms 2800. The panel 2700 of the illustrated example includes a front layer 2710, a front support layer 2730, and a non-reflective layer 2760 that are identical and/or substantially similar to the front layer 1710, the front support layer 1730, and the non-reflective layer 1760, respectively, of FIGS. 11 to 17. In some examples, the panel 2700 includes a wire frame in place of or in addition to the support layer 2730 to provide rigidity to the panel 2700. A first end of each of the support arms 2900 are coupled to the panel 2700, and an opposing second end of each of the support arms 2900 is coupled to a respective one of the attachment mechanisms 2800. In some examples, the supports arms 2900 are coupled to the panel 2700 at a fixed angle. In other examples, the supports arms 2900 are coupled to the panel 2700 such that the angle formed between the panel 2700 and the support arms 2900 is adjustable. Further, the attachment mechanisms 2800 are configured to attach to the electronic device 620 adjacent the screen 622.

Figure 23:
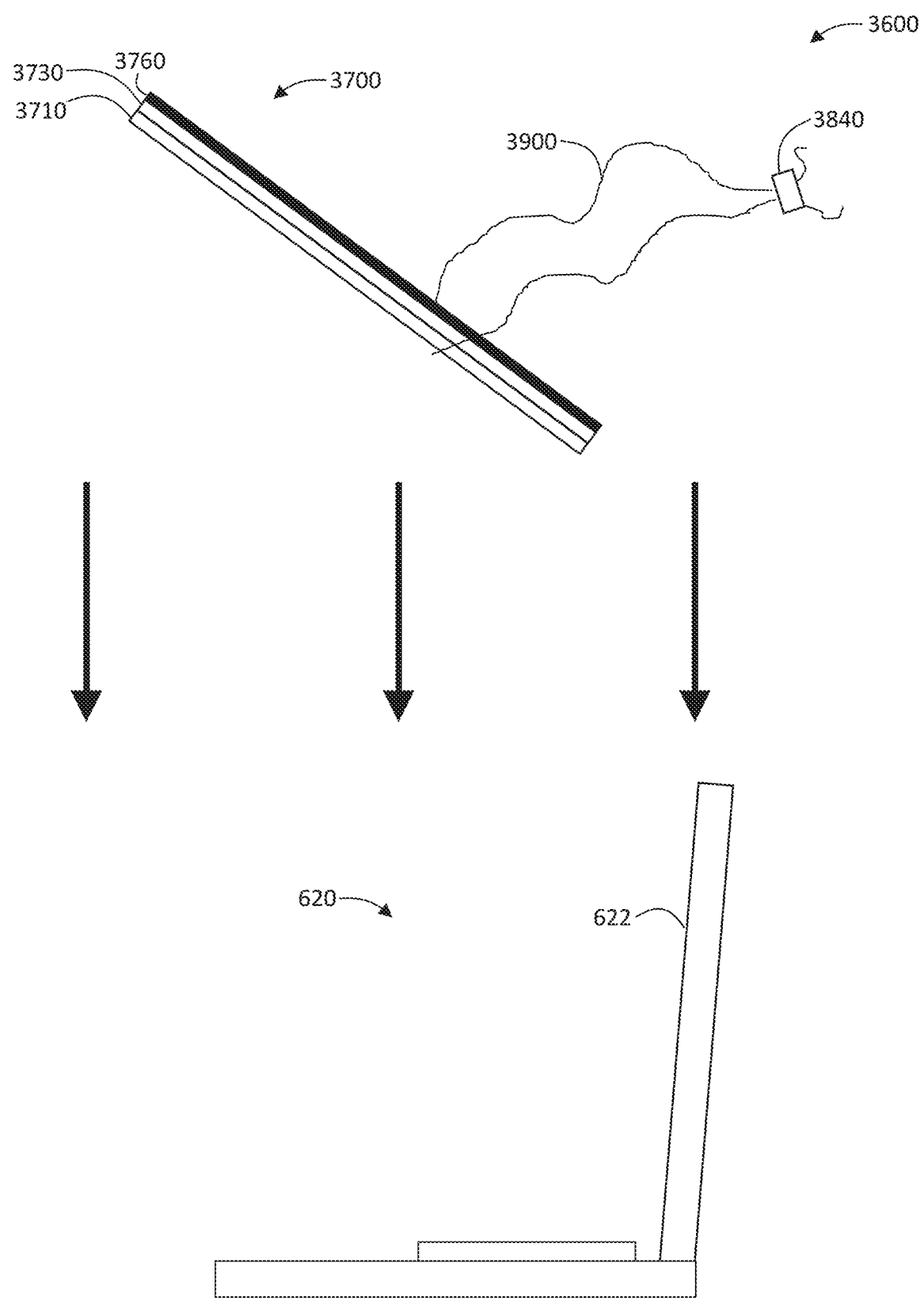
FIG. 23 illustrates another example reflection-reduction device being positioned on an electronic device in accordance with the present disclosure.
Figure 24:
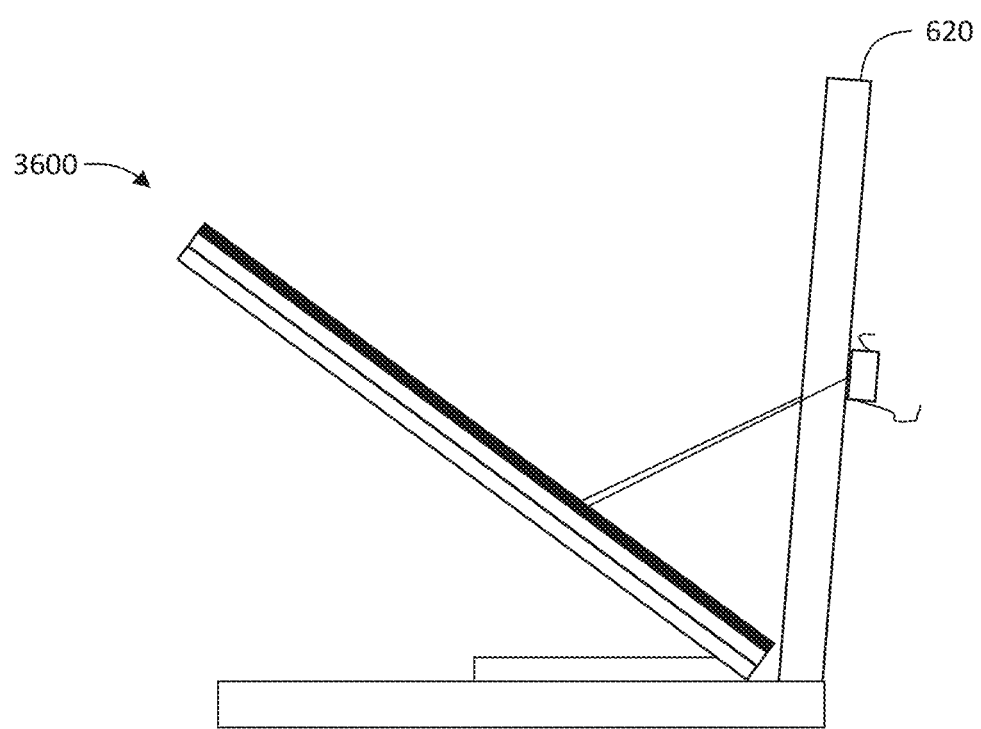
FIG. 24 illustrates the reflection-reduction device of FIG. 23 positioned on the electronic device.

FIGS. 23 and 24 depict an example reflection-reduction device 3600 in accordance with the teachings herein. More specifically, FIG. 23 depicts the reflection-reduction device 3600 being positioned on and/or coupled to the electronic device 620, and FIG. 24 depicts the reflection-reduction device 3600 positioned on and/or coupled to the electronic device 620.

The reflection-reduction device 3600 includes a panel 3700, one or more support arms 3900, and an attachment mechanism 3840. The panel 3700 of the illustrated example includes a front layer 3710, a front support layer 3730, and a non-reflective layer 3760 that are identical and/or substantially similar to the front layer 1710, the front support layer 1730, and the non-reflective layer 1760, respectively, of FIGS. 11 to 17. In some examples, the panel 3700 includes a wire frame in place of or in addition to the support layer 3730 to provide rigidity to the panel 2700.

In FIGS. 23 and 24, the support arms 3900 are formed of string that are connected to and extend between the panel 3700 and the attachment mechanism 3840. The attachment mechanisms 3840 is configured to engage a back surface of the screen 622 of the electronic device 620 to support the panel 3700 as the panel 3700 leans or tilts toward the eye of the user. In some examples, each side edge of the panel 3700 defines a respective notch that is configured to receive one of the respective support arms 3900. The notches receive the support arms 3900 to guide positioning of the panel 3700 at a predefined (e.g., user-defined) angle relative to the screen 622.

Figure 25:
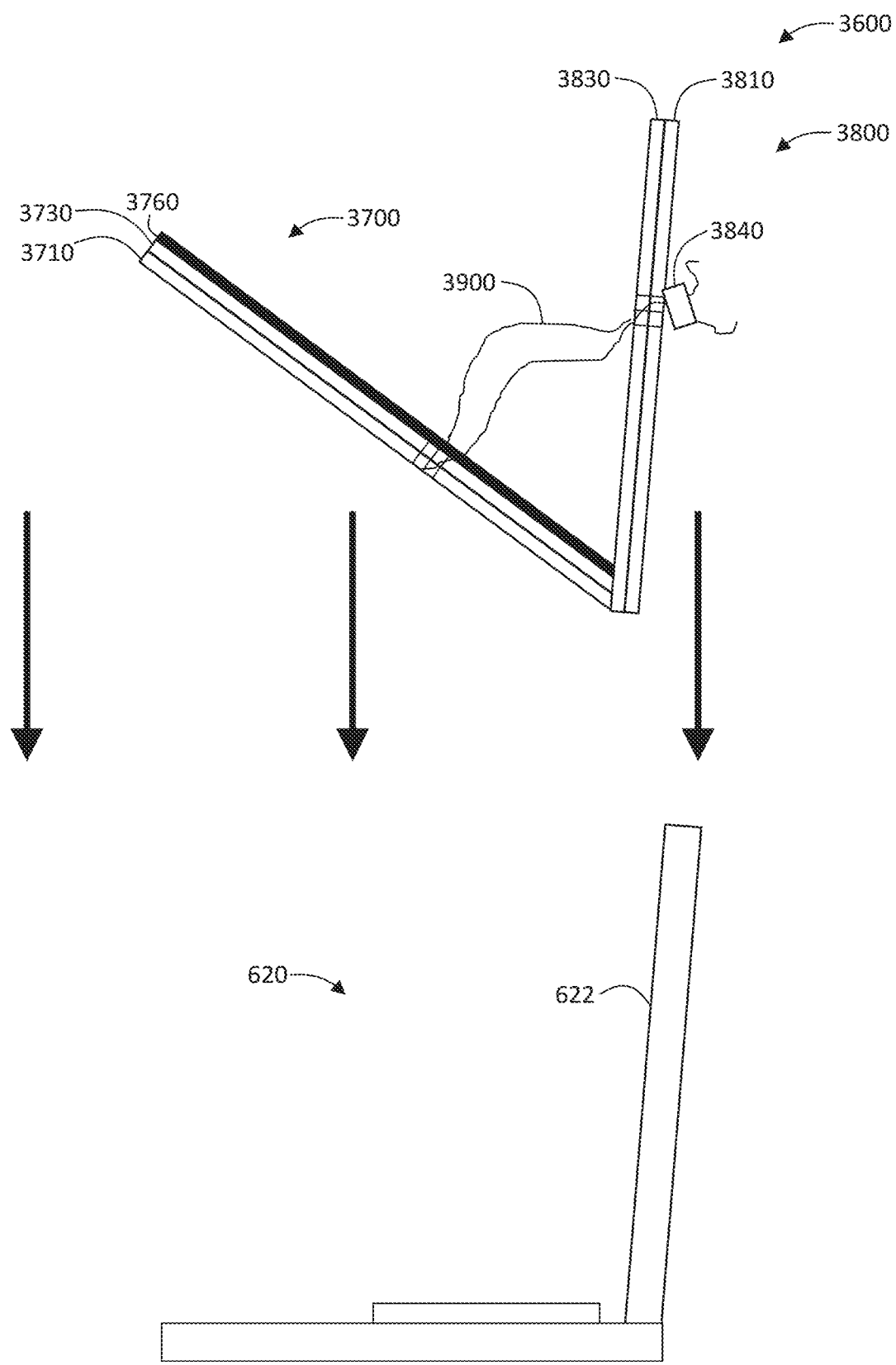
FIG. 25 illustrates the reflection-reduction device of FIG. 23 having a back panel and being positioned on an electronic device in accordance with the present disclosure.
Figure 26:
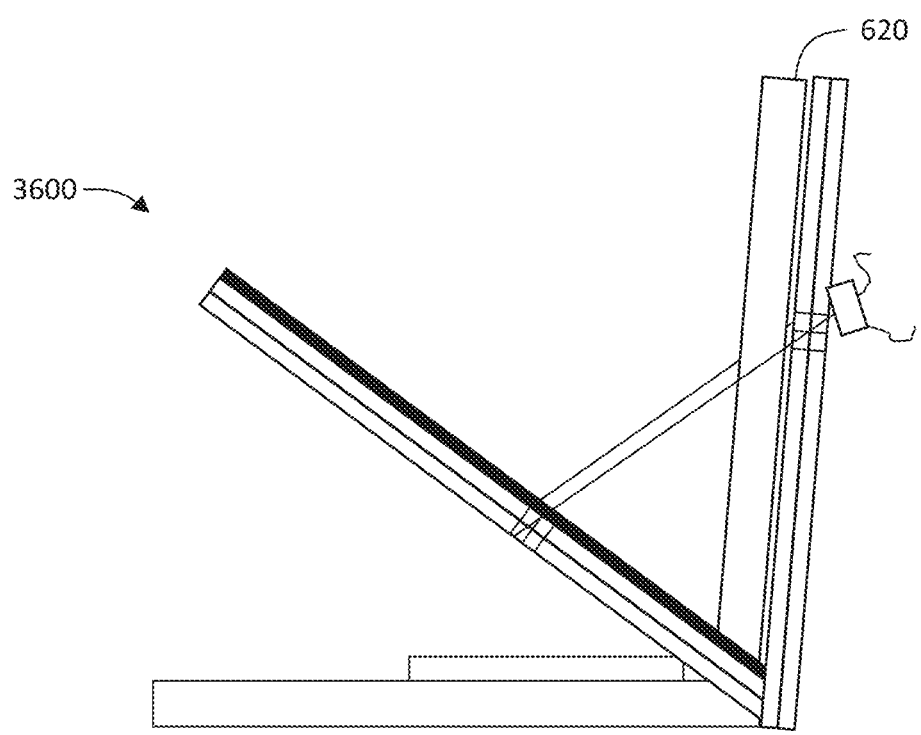
FIG. 26 illustrates the reflection-reduction device of FIG. 25 positioned on an electronic device.

FIGS. 25 and 26 depict the example reflection-reduction device 3600 further including a back panel 3800 in accordance with the teachings herein. More specifically, FIG. 25 depicts the reflection-reduction device 3600 having the back panel 3800 and being positioned on and/or coupled to the electronic device 620, and FIG. 26 depicts the reflection-reduction device 3600 having the back panel 3800 and positioned on and/or coupled to the electronic device 620.

The back panel 3800 includes a back layer 3810 and a back support layer 3830 that are identical and/or substantially similar to the back layer 1810 and the back support layer 1830, respectively, of FIGS. 11 to 14 and 18 to 19. The back panel 3800 is configured to engage a back surface of the screen 622. In FIGS. 25 and 26, the attachment mechanisms 3840 s configured to engage the back panel 3800 to support the panel 3700 as the panel 3700 leans or tilts toward the eye of the user. Further, in the example shown in FIGS. 25 and 26, each side edge of the panel 3700 defines a respective notch 3790 and each side edge of the back panel 3800 defines a respective notch 3890 configured to receive a corresponding one of the support arms 3900. The notches 3790 and 3890 receive the support arms 3900 to guide positioning of the panel 3700 at a predefined (e.g., user-defined) angle relative to the screen 622.

Figure 27:
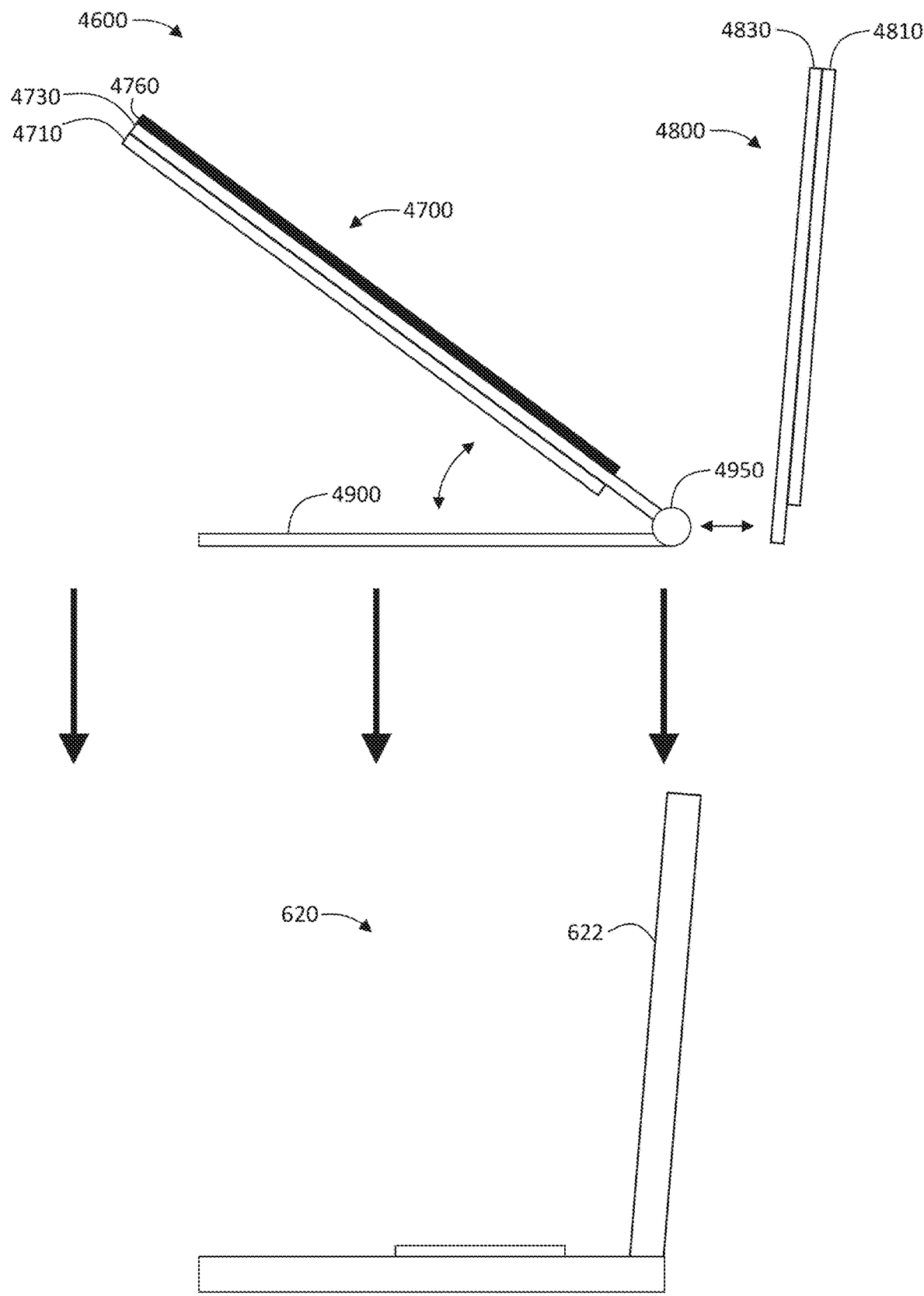
FIG. 27 illustrates another example reflection-reduction device being positioned on an electronic device in accordance with the present disclosure.
Figure 28:
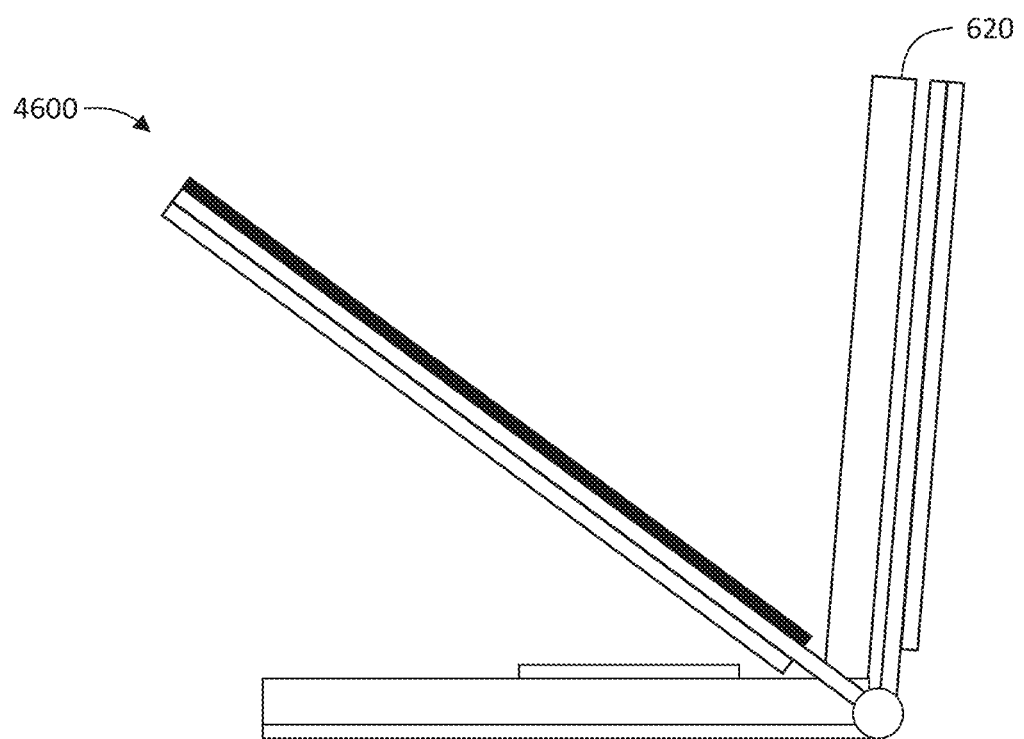
FIG. 28 illustrates the reflection-reduction device of FIG. 27 positioned on the electronic device.

FIGS. 27 and 28 depict an example reflection-reduction device 4600 in accordance with the teachings herein. More specifically, FIG. 27 depicts the reflection-reduction device 4600 being positioned on and/or coupled to the electronic device 620, and FIG. 28 depicts the reflection-reduction device 4600 positioned on and/or coupled to the electronic device 620.

The reflection-reduction device 4600 includes a panel 4700, a back panel 4800, one or more support legs 4900, and one or more friction hinges 4950. The panel 4700 of the illustrated example includes a front layer 4710 and a non-reflective layer 4760 that are identical and/or substantially similar to the front layer 1710 and the non-reflective layer 1760, respectively, of FIGS. 11 to 17. Additionally, the panel 4700 includes one or more support arms 4730 that form a wire frame to which the non-reflective layer 4760 is coupled. The support arms 4730 provide rigidity to the non-reflective layer 4760 as it extends outwardly toward the eyes of the user. In some examples, the panel 4700 also includes a support layer to provide further rigidity to the panel 4700. The support legs 4900 are configured to engage a surface on which the electronic device 620 rests and/or a surface of the electronic device 620 itself to support and position the reflection-reduction device 4600. As illustrated in FIGS. 27 and 28, the support legs 4900 and the support arms 4730 extend from the friction hinges 4950 such that the friction hinges 4950 enables the angle of the panel 4700 to be adjustable. The friction hinges 4950 are attached to and/or positioned adjacent to respective side edges of the electronic device 620. For example, the friction hinges 4950 attach to the base of the electronic device 620 to enable the panel 4700 and the screen 622 to move independently of each other, thereby enabling a user to adjust the angle of the panel 4700 independently of (e.g., before) adjusting the angle of the screen 622.

The back panel 4800 includes a back layer 4810 and a back support layer 4830 that are identical and/or substantially similar to the back layer 1810 and the back support layer 1830, respectively, of FIGS. 11 to 14 and 18 to 19. The back panel 4800 is configured to engage and/or be positioned adjacent a back surface of the screen 622. In the illustrated example, the back panel 4800 is configured to selectively connect to and detach from a base of the reflection-reduction device 4600 that is formed by the support legs 4900 and the hinges 4950.

The back panel 4800 depicted in FIGS. 27 and 28 is optional when the support legs 4900 can support the weight of the panel 4700 without further support and the friction hinges 4950 can maintain the desired angle without contribution of the back panel 4800.

Figure 29:
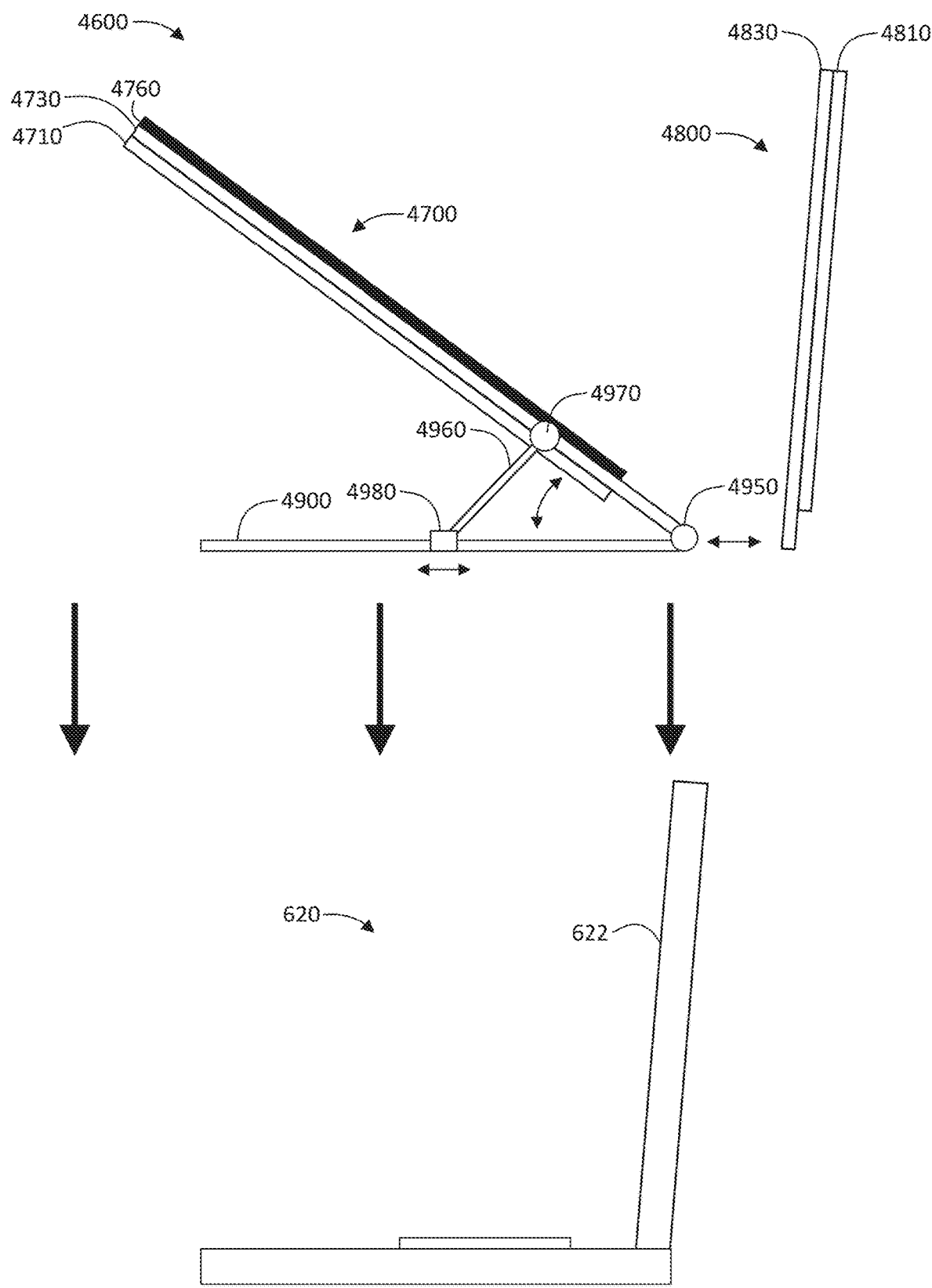
FIG. 29 illustrates the reflection-reduction device of FIG. 27 having a back panel and being positioned on an electronic device in accordance with the present disclosure.
Figure 30:
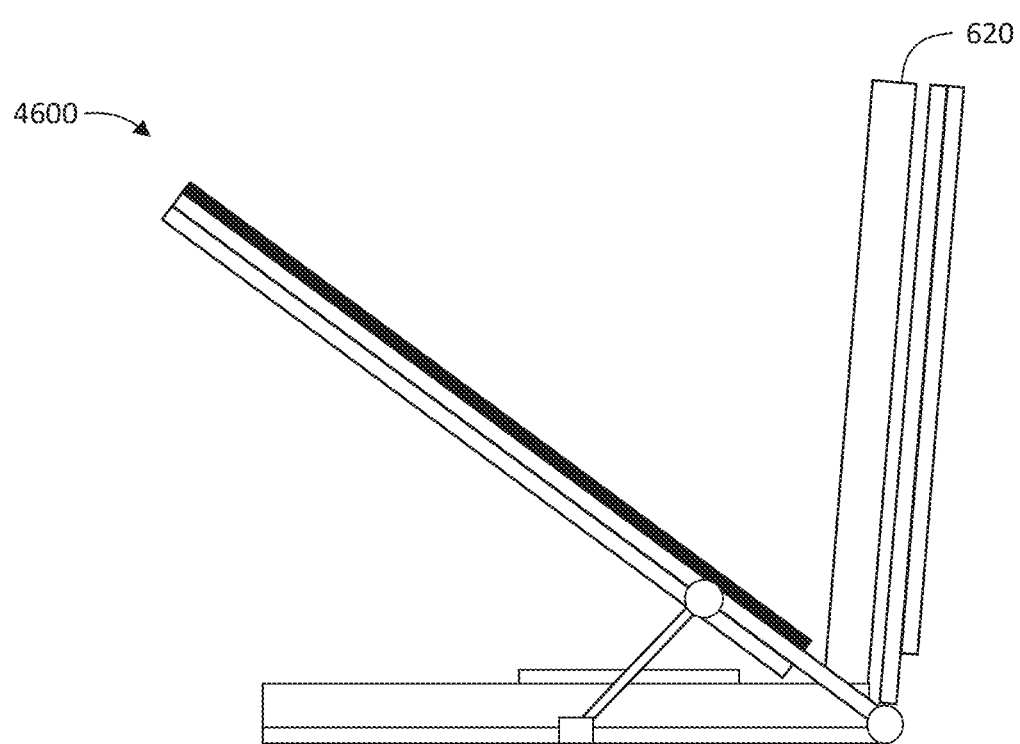
FIG. 30 illustrates the reflection-reduction device of FIG. 29 positioned on an electronic device.

FIGS. 29 and 30 depict the example reflection-reduction device 4600 having one or more support arms 4960 in accordance with the teachings herein. More specifically, FIG. 29 depicts the reflection-reduction device 4600 having the support arms 4960 and being positioned on and/or coupled to the electronic device 620, and FIG. 30 depicts the reflection-reduction device 3600 having the support arms 4960 and positioned on and/or coupled to the electronic device 620.

As illustrated in FIGS. 29 and 30, each of the support arms 4960 extends between a respective side edge of the panel 4700 and the support legs 4900. A rotating hinge 4970 rotatably connects a first end of the support arm 4960 to the panel 4700, and a sliding hinge 4970 slidably connects an opposing second end of the support arm 4950 to a portion of the support legs 4900.

Figure 31:
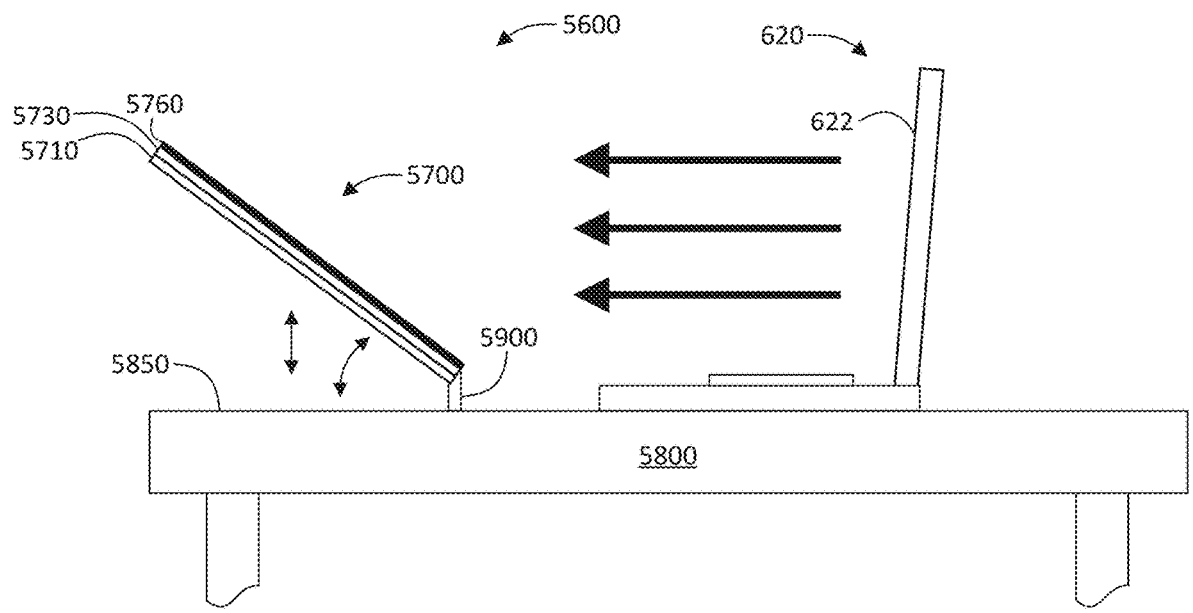
FIG. 31 illustrates an electronic device being positioned for use with another example reflection-reduction device in accordance with the present disclosure.
Figure 32:
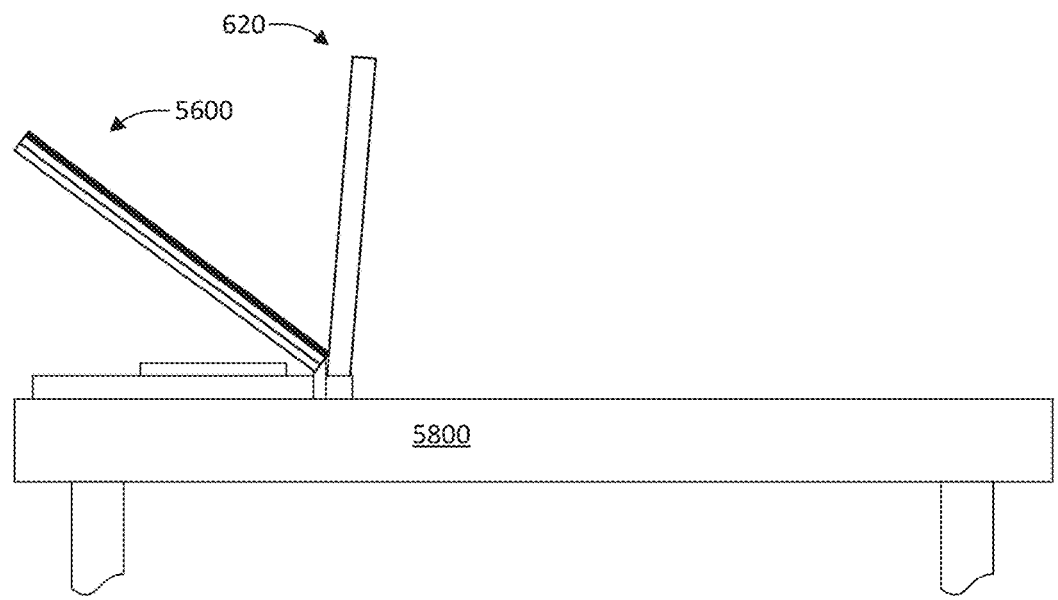
FIG. 32 illustrates the electronic device positioned for use with the reflection-reduction device of FIG. 31.

FIGS. 31 to 32 depict an example reflection-reduction device 5600 in accordance with the teachings herein. More specifically, FIG. 31 depicts the electronic device 620 being positioned for use with the reflection-reduction device 5600, and FIG. 28 depicts the electronic device 620 positioned for use with the reflection-reduction device 5600.

The reflection-reduction device 5600 includes a panel 5700 and one or more support arms 5900. The panel 5700 of the illustrated example includes a front layer 5710, a front support layer 5730, and a non-reflective layer 5760 that are identical and/or substantially similar to the front layer 1710, the front support layer 1730, and the non-reflective layer 1760, respectively, of FIGS. 11 to 17. In some examples, the panel 5700 includes a wire frame in place of or in addition to the support layer 5730 to provide rigidity to the panel 5700. As shown in FIGS. 31 and 32, the panel 5700 extends from the support arms 5900 that are fixed to and extend from a surface 5850 of a table 5800. In the illustrated example, the panel 5700 is hingedly coupled to the support arms 5900 to enable the angle of the panel 5700 to be adjustable.

Figure 33:
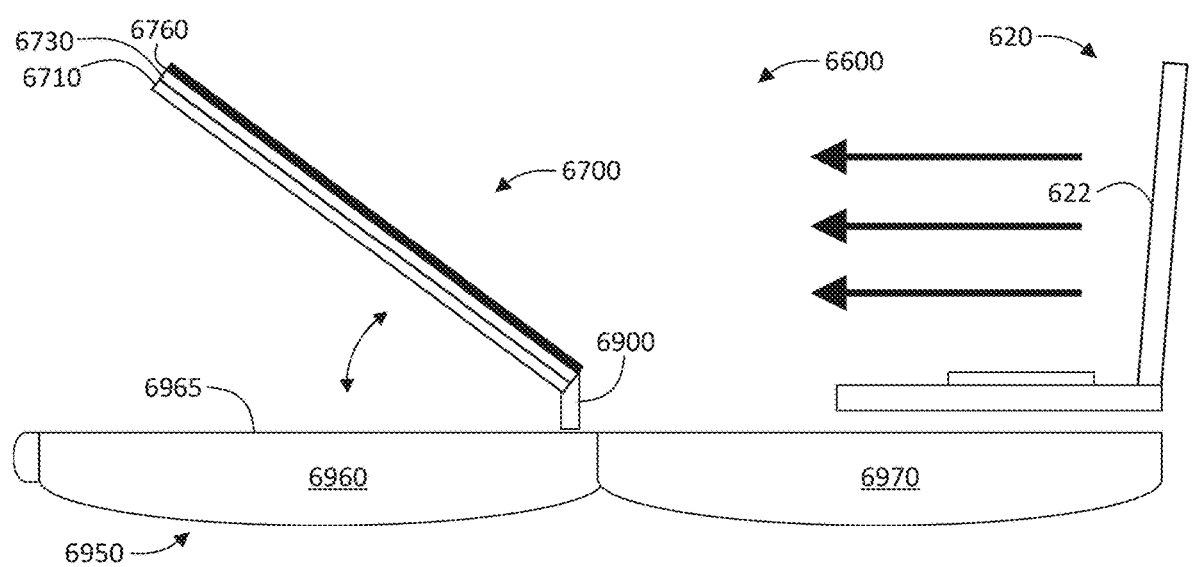
FIG. 33 illustrates an electronic device being positioned for use with another example reflection-reduction device in accordance with the present disclosure.
Figure 34:
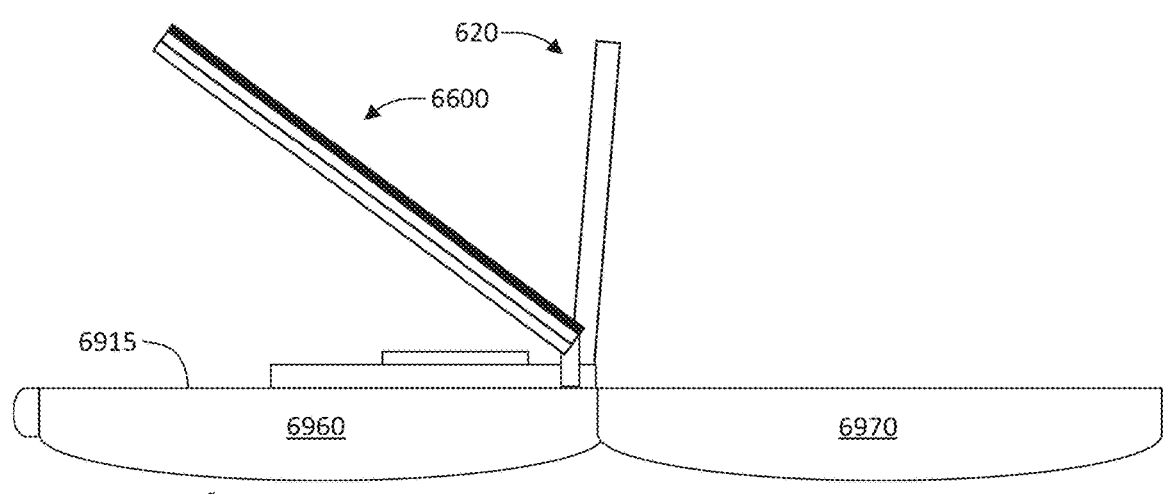
FIG. 34 illustrates the electronic device positioned for use with the reflection-reduction device of FIG. 33.
Figure 35:
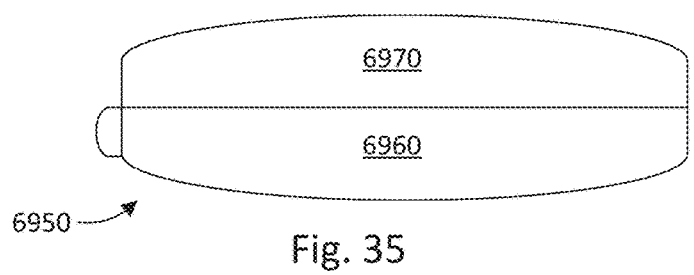
FIG. 35 illustrates the reflection-reduction device of FIG. 33 in a closed position.

FIGS. 33 to 35 depict an example reflection-reduction device 6600 in accordance with the teachings herein. More specifically, FIG. 33 depicts the electronic device 620 being positioned for use with the reflection-reduction device 6600, FIG. 34 depicts the electronic device 620 positioned for use with the reflection-reduction device 6600, and FIG. 35 depicts the reflection-reduction device 5600 closed for storage and/or transport.

The reflection-reduction device 6600 includes a panel 6700 and one or more support arms 6900. The panel 6700 of the illustrated example includes a front layer 6710, a front support layer 6730, and a non-reflective layer 6760 that are identical and/or substantially similar to the front layer 1710, the front support layer 1730, and the non-reflective layer 1760, respectively, of FIGS. 11 to 17. In some examples, the panel 6700 includes a wire frame in place of or in addition to the support layer 6730 to provide rigidity to the panel 6700. As shown in FIGS. 33 and 34, the panel 6700 extends from the support arms 6900 that are fixed to and extend from a surface 6965 formed by a case or bag 6950 for the electronic device 620. In the illustrated example, the panel 6700 is hingedly coupled to the support arms 6900 to enable the angle of the panel 6700 to be adjustable.

As shown in FIGS. 33 to 35, the case or bag 6950 includes a first protective panel 6960 and a second protective panel 6970 that are hingedly coupled together. The first protective panel 6960 defines the surface 6965 from which the support arms 6900 extend. The case or bag 6950 is configured to be closed to facilitate storage and/or transportation of the electronic device 620.

Figure 36:
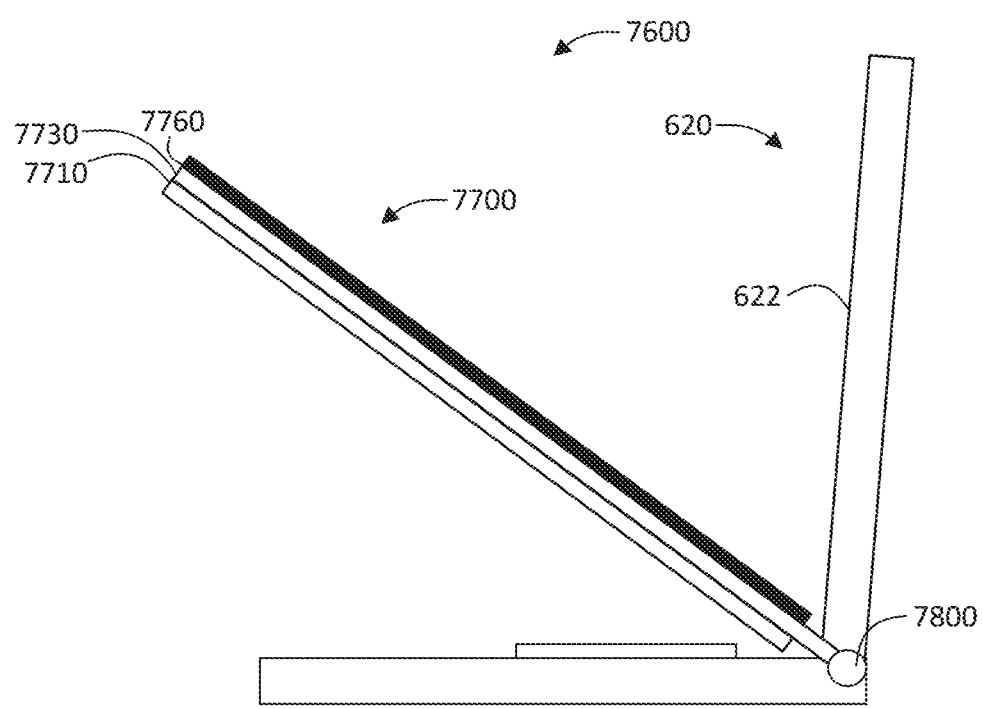
FIG. 36 another example reflection-reduction device positioned on an electronic device in accordance with the present disclosure.

FIG. 36 depict an example reflection-reduction device 7600 in accordance with the teachings herein. As shown in FIG. 36, the reflection-reduction device 7600 is fixedly coupled to and/or integrally formed with the electronic device 620. The reflection-reduction device 7600 includes a panel 7700 and one or more connection mechanisms 7800. The panel 7700 of the illustrated example includes a front layer 7710 and a non-reflective layer 7760 that are identical and/or substantially similar to the front layer 1710 and the non-reflective layer 1760, respectively, of FIGS. 11 to 17.

Additionally, the panel 7700 includes one or more support arms 7730 that form a wire frame to which the non-reflective layer 7760 is coupled. The support arms 7730 provide rigidity to the non-reflective layer 7760 extending outwardly toward the eyes of the user. In some examples, the panel 7700 includes a support layer in place of or in addition to the support arms 7730 to the panel 7700. As illustrated in FIG. 36, the support arms 7730 and/or a support layer extends from the connection mechanisms 7800 that are integrally formed with the electronic device 620, In some examples, the connection mechanisms 7800 include hinges to enable the angle at which the panel 770 to be adjustable.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

Various examples are described in the following clauses. The examples set forth in any of the following clauses may be incorporated and implemented in combination with any of the other examples described throughout the instant disclosure and in accordance with the techniques and benefits described herein.

Clause 1. A device for reducing specular reflection comprising: a planar support structure; a non-reflective top layer affixed to a first side of the planar support structure; and an attachment mechanism configured to affix the device to an electronic device having a screen, such that the device extends at an angle from a bottom edge of the screen of the electronic device.

Clause 2. A device of clause 1, wherein the planar support structure is rigid.

Clause 3. The device of clause 1, wherein the planar support structure is semi-rigid.

Clause 4. The device of any preceding clause, wherein the planar support structure is opaque.

Clause 5. The device of any preceding clause, wherein the planar support structure further comprises an opaque bottom layer affixed to the second side of the planar support structure.

Clause 6. The device of any preceding clause, wherein the support structure comprises a rectangular shape, an X shape, an H shape, an I I shape, or a U shape, preferably a rectangular shape.

Clause 7. The device of any preceding clause, wherein the non-reflective top layer is configured to absorb greater than 96% of visible light.

Clause 8. The device of any preceding clause, wherein the non-reflective top layer is configured to absorb greater than 97% of visible light.

Clause 9. The device of any preceding clause, wherein the non-reflective top layer is configured to absorb greater than 98% of visible light.

Clause 10. The device of any preceding clause, wherein the non-reflective top layer is configured to absorb greater than 99% of visible light.

Clause 11. The device of any preceding clause, wherein the non-reflective top layer is smooth.

Clause 12. The device of any preceding clause, wherein the non-reflective top layer is a textured surface.

Clause 13. The device of any preceding clause, further comprising a secondary back panel configured to contact the back of a screen of the electronic device.

Clause 14. The device of clause 13, wherein the back panel is resistant to heating.

Clause 15. The device of any preceding clause, wherein dimensions of the device are in proportion to dimensions of the screen of the electronic device.

Clause 16. The device of any preceding clause, wherein the electronic device is a laptop.

Clause 17. The device of any preceding clause, wherein the width of the device ranges from 5.5 to 22.5 inches, preferably 2 inches wider than the electronic device.

Clause 18. The device of any one of clauses 1-15, wherein the electronic device is a mobile phone or tablet.

Clause 19. The device of any preceding clause, wherein the height of the device in the direction of extension ranges from 3.5 to 17.1 inches, preferably of adjustable length in the direction of extension and approximately 50% longer in the direction of extension than the height of the electronic device.

Clause 20. The device of any preceding clause, wherein the width of the device ranges from 1.5 to 6 inches.

Clause 21. The device of any preceding clause where the planar support structure or the non-reflective top layer comprises one or more paints, one or more dyes, one or more material layers, and/or one or more coatings.

Clause 22. The device of clause 21, wherein the paint is Stuart Semple's Black 2.0 or Black 3.0.

Clause 23. The device of clause 21, wherein the material layer is black velvet.

Clause 24. The device of clause 21, wherein the coating comprises one or more of the following characteristics: low or ultra-low reflectance; absorption of visible light, and, optionally, UV and IR light; hydrophobic, shock resistant, and vibration resistant, preferably Surrey NanoSystems Vantablack or an equivalent.

Clause 25. The device of any preceding clause, wherein the thickness of the device is less than 20 mm.

Clause 26. The device of any preceding clause, wherein the thickness of the device is less than 15 mm.

Clause 27. The device of any preceding clause, wherein the thickness of the device is less than 10 mm or less than 5 mm.

Clause 28. The device of any preceding clause, wherein the device attachment means to attach the back panel to the planar support structure or a layer thereof.

Clause 29. The device of clause 28, wherein the attachment means are selected from the group consisting of truss arms, wire, a hook, string, wrap, and woven materials.

Clause 30. The device of any preceding clause, wherein the planar support structure comprises multiple layers.

Clause 31. The device of any preceding clause, wherein the planar support structure comprises a front layer and a front support layer.

Clause 32. The device of any preceding clause, wherein the planar support structure has sufficient rigidity to prevent substantial sagging.

Clause 33. The device of any preceding clause, wherein the planar support structure has sufficient rigidity to prevent sagging.

Clause 34. The device of any preceding clause, wherein the planar support structure comprises a scallop cut along the edge closest to the electronic device.

Clause 35. The device of any preceding clause, wherein the planar support structure and any layers affixed thereto comprises a scallop cut along the edge closest to the electronic device.

Clause 36. The device of any one of clauses 34-35, wherein the scallop cut comprises a cut of 5 mm.

Clause 37. The device of any preceding clause, wherein the attachment mechanism between the device and the electronic device is selected from the group consisting of an adhesive, a stand, legs, a hanger, clip, magnet, suction means, integration into the electronic device, integration into a third article such as carrying case, a clip, clamp, groove, a hook, string, wrap, ledge, upside down pocket, or other mechanism that grips onto or connects to the electronic device.

Clause 38. The device of any preceding clause, wherein the device is integrated into a piece of furniture, such as a table or other furniture piece with a planar surface.

Clause 39. The device of any preceding clause, wherein the device is collapsible.

Clause 40. The device of any preceding clause, wherein the device is configured to contract and expand by extending, unfolding, using an accordion-like motion, using sliding or rotating panels, telescoping, and/or unfurling.

I claim:

1. A specular reflection-reduction device, comprising:
a panel configured to extend from a bottom edge of a display screen of an electronic device and toward eyes of a user, the panel having a completely opaque non-reflective surface configured to face toward the display screen, the completely opaque non-reflective surface configured to inhibit light from reflecting into the eyes of the user,
wherein the specular reflection-reduction device lacks a top panel and side panels contacting the top panel.

2. The specular reflection-reduction device of claim 1, wherein the non-reflective surface is formed of non-reflective paint or fabric.

3. The specular reflection-reduction device of claim 1, wherein the specular reflection-reduction device is detachable from the electronic device.

4. The specular reflection-reduction device of claim 3, wherein the panel includes at least one predefined fold line to enable the specular reflection-reduction device to collapse when detached from the electronic device.

5. The specular reflection-device of claim 3, wherein dimensions of the device are in proportion to dimensions of the screen of the electronic device.

6. The specular reflection-reduction device of claim 1, wherein the panel includes a front layer and a non-reflective layer.

7. The specular reflection-reduction device of claim 6, wherein the non-reflective layer forms the non-reflective surface.

8. The specular reflection-reduction device of claim 6, wherein the front layer includes a vertical score line that enables the panel to bend into a shape that increases the rigidity of the panel in order to deter the panel from sagging when extending toward the eyes of the user.

9. The specular reflection-reduction device of claim 8, wherein the front layer includes a scallop-cut bottom edge that further increases the rigidity of the panel in order to deter the panel from sagging when extending toward the eyes of the user.

10. The specular reflection-reduction device of claim 6, wherein the panel further includes a support layer coupled to at least one of the front layer and the non-reflective layer to support the panel in extending toward the eyes of the user from the bottom edge of the display screen.

11. The specular reflection-reduction device of claim 6, wherein the panel further includes a wire frame for the non-reflective layer to support the panel in extending toward the eyes of the user from the bottom edge of the display screen.

12. The specular reflection-reduction device of claim 1, wherein the panel is configured to extend at angle of between 30 degrees and 75 degrees relative to the display screen of the electronic device.

13. The specular reflection-reduction device of claim 1, further comprising one or more support arms coupled to the panel to support the panel in extending toward the eyes of the user from the bottom edge of the display screen.

14. The specular reflection-device of claim 1, wherein the non-reflective top layer is configured to absorb greater than 96% of visible light.

15. The specular reflection-device of claim 1, wherein the non-reflective top layer is smooth.

16. A method of manufacturing the specular reflection-device of claim 1, the method comprising:
constructing a rigid planar support structure;
adding one or more features to the rigid planar support structure to enable the rigid planar support structure to be compactible;
reducing a weight of the rigid planar support structure;
affixing a completely opaque bottom layer to a first side of the rigid planar support structure;
affixing a non-reflective top layer to a second side of the rigid planar support structure; and
connectably attaching a secondary back panel to the rigid planar support structure; and
affixing an attachment mechanism to the rigid planar support structure.

\* \* \* \* \*